US012381637B2

(12) United States Patent
Bushnaq et al.

(10) Patent No.: US 12,381,637 B2
(45) Date of Patent: *Aug. 5, 2025

(54) SYSTEMS, METHODS, AND COMPUTER-READABLE MEDIA OF AUTOMATIC NETWORK SLICING OF UNDERWATER ACOUSTIC COMMUNICATION SYSTEM RESOURCES

(71) Applicant: Technology Innovation Institute—Sole Proprietorship LLC, Masdar (AE)

(72) Inventors: Osama M. Bushnaq, Abu Dhabi (AE); Igor V. Zhilin, Abu Dhabi (AE); Giulia De Masi, Abu Dhabi (AE); Enrico Natalizio, Dubai (AE); Ian F. Akyildiz, Atlanta, GA (US); Najwa Aaraj, Dubai (AE)

(73) Assignee: Technology Innovation Institute—Sole Proprietorship LLC, Masdar (AE)

( * ) Notice: Subject to any disclaimer, the term of this patent is extended or adjusted under 35 U.S.C. 154(b) by 0 days.

This patent is subject to a terminal disclaimer.

(21) Appl. No.: 18/640,205

(22) Filed: Apr. 19, 2024

(65) Prior Publication Data

US 2024/0267134 A1 Aug. 8, 2024

Related U.S. Application Data

(63) Continuation of application No. 18/161,168, filed on Jan. 30, 2023, now Pat. No. 11,967,997, which is a continuation of application No. 17/806,283, filed on Jun. 10, 2022, now Pat. No. 11,569,920.

(51) Int. Cl.
*H04B 11/00* (2006.01)
*H04B 13/02* (2006.01)

(52) U.S. Cl.
CPC ............. *H04B 11/00* (2013.01); *H04B 13/02* (2013.01)

(58) Field of Classification Search
CPC .............................. H04B 11/00; H04B 13/02
See application file for complete search history.

(56) References Cited

U.S. PATENT DOCUMENTS

| | | | | |
|---|---|---|---|---|
| 5,687,137 A * | 11/1997 | Schmidt | ................ | H04B 11/00 367/133 |
| 5,894,450 A * | 4/1999 | Schmidt | ............... | G01V 1/3817 367/133 |
| 6,721,235 B2 * | 4/2004 | Chiang | ................ | H01Q 3/2682 367/138 |
| 7,688,680 B1 * | 3/2010 | Gunasekara | ........... | H04B 11/00 367/134 |
| 9,294,201 B2 * | 3/2016 | Farr | ....................... | H04B 10/80 |
| 9,457,331 B2 * | 10/2016 | Siliqi | ........................ | C01B 3/38 |

(Continued)

OTHER PUBLICATIONS

Office Action for United Arab Emirates Patent Application No. P6001360/2023, dated Oct. 1, 2024, 6 pages.

*Primary Examiner* — Daniel L Murphy
*Assistant Examiner* — Amie M Ndure
(74) *Attorney, Agent, or Firm* — DLA PIPER LLP (US)

(57) ABSTRACT

Systems, methods, and computer-readable media for managing underwater acoustic communications. An automatic network slicing method specifically designed for handling underwater acoustic communications is implemented to enable admission control, routing, and dynamic resource allocation based on service level agreement requirements.

20 Claims, 27 Drawing Sheets

(56) References Cited

U.S. PATENT DOCUMENTS

| | | | |
|---|---|---|---|
| 9,746,444 B2* | 8/2017 | Goroshevskiy | G01N 27/82 |
| 2009/0323472 A1* | 12/2009 | Howe | G01V 1/005 |
| | | | 367/41 |
| 2013/0258806 A1* | 10/2013 | Siliqi | G01V 1/3808 |
| | | | 367/15 |
| 2016/0146758 A1* | 5/2016 | Goroshevskiy | G01N 27/82 |
| | | | 324/240 |
| 2020/0008073 A1* | 1/2020 | Cui | H04W 16/10 |
| 2020/0025629 A1* | 1/2020 | Zinger | G05D 23/1917 |
| 2020/0294401 A1* | 9/2020 | Kerecsen | G08G 1/205 |
| 2020/0389469 A1* | 12/2020 | Litichever | H04W 4/40 |

* cited by examiner

500

```
receiving a slice request, wherein the communication request comprises
a source and a destination, wherein the source and destination are
selected from the controller and the plurality of nodes, and wherein the
slice request is associated with a service level agreement (SLA)
510
```

↓

```
adding the received plurality of slice requests to a pool of slice requests
515
```

↓

```
for each slice request in the pool of slice requests, nominating all routes
that exist between the source and the destination that satisfy the SLA
requirements    520
```

↓

```
assessing whether a nominated route for each slice request contained
in the pool of slice request balances maximization of a utility function
and minimization of congested UALs expected to be used by other
slice requests within the pool of slice requests    530
```

↓

```
rejecting a slice request if that slice request fails to include a nominated
route that balances maximization of the utility function and minimization of
congested UALs by returning that slice request to the pool of slice requests
540
```

↓

```
accepting a slice request if that slice request includes a selected
nominated route that balances maximization of the utility function and
minimization of congested UALs by executing underwater acoustic
communications via the UACS in accordance with the selected
nominated route for that slice request    550
```

FIG. 5

600 generating a first table comprising next-hop UAL rate and time delay characteristics for the plurality of nodes  610 generating a second table of incomplete potential routes for each hop count, until a maximum hop count is reached  620 accessing the first table for the next-hop UAL rate and time delay characteristics to build incomplete potential routes for each h-hop, where h-hop denotes the number of hops in a potential route, and wherein the h-hop does not exceed the maximum hop count  622 adding potential routes to the second table if rate and time delay of a potential route satisfies the SLA requirements  624 if a potential route contained within the second table includes the destination, adding that potential route to a third table comprising nominated routes  630

FIG. 6

Algorithm 1 Slice nominated routes.

1: Fill the "1-st hop incomplete routes" table with:

| Route | $R^r$ | $T^r$ | $R_s^{r \rightarrow v_{dst}}$ | $T_s^{r \rightarrow v_{dst}}$ |
|---|---|---|---|---|
| $v_{src} \rightarrow v_{nxt,k_1}$ | $\infty$ | 0 | $R_{v_{src}, v_{nxt,k_1}}$ | $T_{v_{src}, v_{nxt,k_1}}$ |
| $v_{src} \rightarrow v_{nxt,k_2}$ | $\infty$ | 0 | $R_{v_{src}, v_{nxt,k_2}}$ | $T_{v_{src}, v_{nxt,k_2}}$ |

2: for $h = 2 : H$ do
3:   for all "$(h-1)$-th incomplete routes" table rows do
4:     if $R_s^{r \rightarrow v_{dst}} \geq R_s^{th}$ and $T_s^{r \rightarrow v_{dst}} \leq T_s^{th}$ then
5:       add route to the "nominated routes" table
6:     end if
7:     if $T_s^{r \rightarrow v_{dst}} \leq T_s^{th}$ then
8:       Add a new route to the $h$-th hop incomplete routes table by adding a new hop towards each neighbor of the last node in the $(h-1)$-th incomplete route
9:       Calculate $R^{r,h} = \min\{R^{r,h-1}, R_{v_i, v_j, k}\}$ and $T^{r,h} = T^{r,h-1} + T_{v_i, v_j, k}$
10:      Calculate $R_s^{r \rightarrow v_{dst}} = \min\{R^r, R_{v_i, v_{dst}, k}\}$ and $T_s^{r \rightarrow v_{dst}} = T^r + T_{v_i, v_{dst}, k}$
11:     end if
12:   end for
13: end for

FIG. 8

Algorithm 2 Route selection and resource allocation.

1: Update $\overline{R_{b,p,s,k}}$ as in (21)
2: Update $\overline{Y_{c,p,s,k}}$ as in (22)
3: for all slices in the slices pool do
4:     Randomly select a slice, $s$, with probability as in (20)
5:     for all selected slice nominated routes do
6:         Update $R_s = \min R_{b,p,s,k}, \forall p_s \in \rho$
7:         if updated $R_s < R_s^{th}$ then
8:             Remove route from selected slice "nominated routes" table
9:         end if
10:     end for
11:     if the "nominated routes" table of the slice $s$ is empty then
12:         Reject the slice $s$
13:     else
14:         Calculate $L(\overline{R_s})$ as in (23)
15:         Select route and resource allocation by solving (24)
16:     end if
17:     Update $\overline{R_{b,p,s,k}}$ as in (21)
18:     Update $\overline{Y_{c,p,s,k}}$ as in (22)
19: end for

FIG. 9

SYSTEMS, METHODS, AND COMPUTER-READABLE MEDIA OF AUTOMATIC NETWORK SLICING OF UNDERWATER ACOUSTIC COMMUNICATION SYSTEM RESOURCES

CROSS-REFERENCE TO RELATED APPLICATIONS

This is a continuation of U.S. application Ser. No. 18/161,168, filed Jan. 30, 2023, which is a continuation of U.S. application Ser. No. 17/806,283, filed Jun. 10, 2022, now U.S. Pat. No. 11,569,920, issued Jan. 31, 2023, the content of which are hereby incorporated by reference in their entireties.

TECHNICAL FIELD

This disclosure relates to systems, methods, and computer-readable media for managing underwater acoustic communication resources, and in particular, to managing automatic network slicing of underwater acoustic systems.

BACKGROUND

The underwater environment is extremely challenging for wireless communications and networking. The main reason is related to the communication channels' characteristics in the underwater environment. Radio frequency (RF) and magnetic induction (MI) are severely absorbed in salty water, which limits transmission distance to 100 m at frequencies of about 30 Hz-300 Hz. Optical communications suffer from high scattering losses due to turbulence in the underwater environment, limiting its reliability and transmission distance. Acoustic communications technology, despite its propagation delay and multi-path fading, is the typical physical layer technology in underwater networks. Underwater acoustic communication (UAC) offers a long-range and reliable solution for low-rate wireless communications in different water environments. In addition to the harsh communication characteristics, other challenges of underwater networks include the high cost, low level of supervision, and limited power supply.

Accordingly, what is needed are systems and methods to enable efficient, reliable, and flexible network slicing of underwater acoustic communication systems (UACS).

SUMMARY

Systems, methods, and computer-readable media for managing automatic network slicing of underwater acoustic system resources within an underwater acoustic communication system are provided. The underwater acoustic communications system can include a controller positioned at or near a surface of a water body and several nodes that are distributed throughout the water body. The controller and nodes have bidirectional acoustic communications capability to establish underwater acoustic links (UALs). In one embodiment, a method is provided for receiving a plurality of slice requests, wherein each slice request comprises a source and a destination, wherein the source and destination are selected from the controller and the plurality of nodes, and wherein each slice request is associated with service level agreement (SLA) requirements, wherein the SLA requirements comprises a slice rate threshold and a slice time delay threshold. The method can include adding the received plurality of slice requests to a pool of slice requests, nominating all routes that exist between the source and the destination that satisfy the SLA requirements for each slice request in the pool of slice requests, and assessing whether a nominated route for each slice request contained in the pool of slice request balances maximization of a utility function and minimization of congested UALs expected to be used by other slice requests within the pool of slice requests. A slice request can be rejected if that slice request fails to include a nominated route that balances maximization of the utility function and minimization of congested UALs by returning that slice request to the pool of slice requests. A slice request can be accepted if that slice request includes a selected nominated route that balances maximization of the utility function and minimization of congested UALs by executing underwater acoustic communications via the UACS in accordance with the selected nominated route for that slice request.

This Summary is provided to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The above and other aspects of the disclosure, its nature, and various features will become more apparent upon consideration of the following detailed description, taken in conjunction with the accompanying drawings, in which like reference characters may refer to like parts throughout, and in which:

FIG. 5 shows an illustrative process for solving automatic network slicing for an underwater acoustic communications system according to an embodiment.

FIG. 6 shows illustrative steps for nominating routes according to an embodiment.

FIG. 8 shows an algorithm for nominating routes according to an embodiment.

FIG. 9 shows an algorithm for selecting a nominated route for a slice request according to an embodiment.

DETAILED DESCRIPTION

Figure 1:
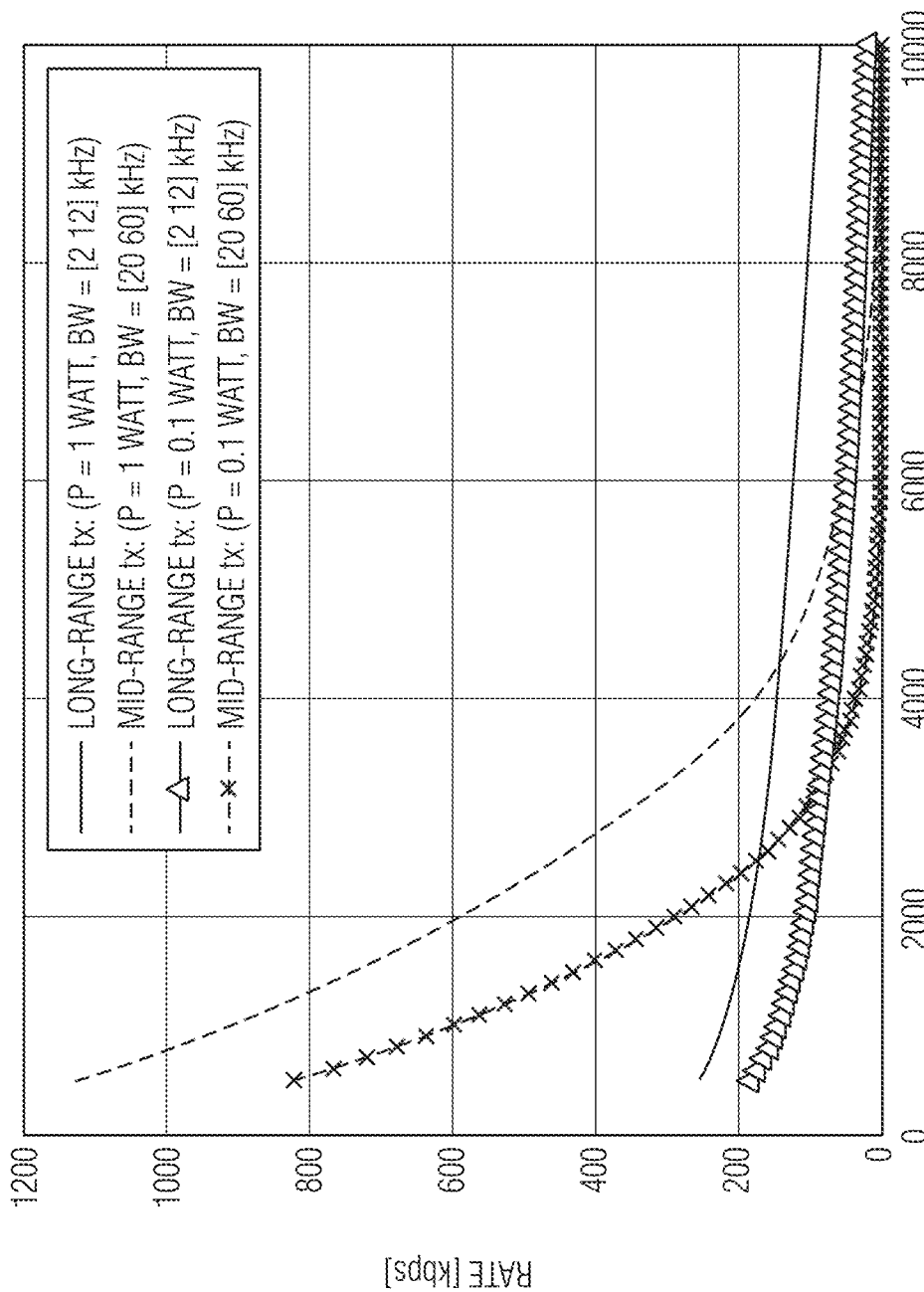
FIG. 1 shows the achievable rates for different transmission powers and frequency spectra versus transmission distance.

Systems, methods, and computer-readable media for enabling automatic network slicing of underwater acoustic system resources are provided and described with reference to FIGS. 1-22. Networking solutions according to embodiment discussed herein enable efficient, reliable, and flexible underwater acoustic communication systems (UACS) that utilize automatic network slicing. To enable efficient resource management on top of software defined network (SDN) architecture, network slicing (NS) can be utilized. Consider a network serving multiple applications or agents, where the connectivity requirements are different per application/agents. For example, one UACS network could be used to provide underwater telemetry (delay tolerant and requires low data rate), underwater emergency communication (delay intolerant but requires low data rate), underwater imaging and surveillance (delay tolerant but requires high data rate), and so on. Network slicing offers a cost-effective and bandwidth-efficient solution to serve multiple UACS applications/agents with different Service Level Agreement (SLA) requirements, using the same network infrastructure. This can be done by creating multiple networks slices on top of a common shared physical infrastructure, where a network slice is a logical network that provides specific network capabilities and characteristics in order to serve a defined business purpose of a customer. As a result, network resources are provided as per application (i.e., slice) requirements. Furthermore, network slicing naturally provides functional isolation of services across multiple agents. Hence, cost is significantly reduced because the same network infrastructure can be shared among multiple agents. UACS network slicing embodiments discussed herein address the foregoing reasons.

Network slicing has been extensively studied for next generation cellular networks, (e.g., 5G/6G). Resource allocation, including spectral bandwidth, transmission power and cache storage for NS plays a pivotal role in load balancing, resource utilization, and networking performance. Network slicing can be performed on radio access network (RAN) bandwidth resources, base-station (BS) cache storage, and backhaul capacity. NS in heterogeneous-cloud RAN (H-CRAN) network can be performed as a process of allocating network resources to users associated with different tenants/slices. In another approach, a slicing scheme that consists of an upper-level slicing, which manages admission control, user association, and baseband resource allocation can be implemented. A service-oriented deployment policy of end-to-end 5G network slicing is proposed, where slice requests are mapped to network infrastructure. Automatic network slicing (ANS), where network slicing is purely service level agreement (SLA)-based and does not require extra knowledge of the resource requirements associated with a slice, was recently proposed for 5G, and for low Earth orbit (LEO) satellite assisted networks. In ANS, tenants no longer need to model their slices in terms of explicit resource requirements. Instead, slices are created, admitted, and managed in ANS automatically based on the SLA. Such an SLA-based slicing can help abstract the complexities of slice implementation and customization to address different use cases, and slice priorities.

Conventional UACS systems have adopted multimode software defined radio to compensate acoustic communication weaknesses with other physical mediums when possible. Software Defined Networks (SDN) have been proposed as a solution to implement large scale UACS. SDN offers a highly flexible, programmable, and virtualizable network architecture to improve network resource utilization, simplify network management, reduce operating costs, and enable innovation and evolution. Enabling globally optimized resource management and functional isolation of services is essential to serve multiple UACS applications with different Service Level Agreement (SLA) requirements, using the same network infrastructure. Network Slicing (NS) allows multiple virtual networks to be created on top of a common shared physical infrastructure, where a network slice is a logical network that provides specific network capabilities and characteristics to serve a defined business purpose of a customer.

Embodiments discussed herein include an optimization framework for ANS in UACS. The ANS enables globally optimized solutions, enhances quality of service (QOS), simplifies network operation, and reduces deployment costs. Such paradigm is akin to terrestrial networks (e.g., 5G/6G networks), but direct application of conventional slicing algorithms for terrestrial 5G/6G networks to UACS is prohibitive, due to the difference in the channel characteristics and problem constraints. For instance, acoustic channel path loss is a function of transmission frequency and distance, creating long-range and mid-range transmission bands depending on the transmission frequency. Taking these transmission bands' features into account at the network management level is critical for optimal resource allocation. Additionally, underwater acoustic propagation delay is extremely high. Hence, routes that propagate over long distances can be quickly eliminated which reduces the computational complexity of ANS. Therefore, the underwater automatic slicing framework is specifically tailored to take the challenging underwater acoustic channel characteristics into account. Furthermore, the underwater ANS solution takes advantage of the simplified underwater network architecture. The underwater ANS embodiments use systematic slice admission control, routing and resource allocation based on the SLA given/required by the tenants/applications. Although conventional approaches such as Software Defined Networks (SDN) have been attempted for underwater networks, such systems are inferior to the underwater ANS embodiments discussed herein for underwater communication systems.

An underwater ANS solution for UACS is discussed herein. Based on a SDN architecture with one controller on the sea surface, a centralized optimization algorithm can be run at the controller to maximize a utility function that models ANS performance gain. Practical slice request management, admission, and release are also discussed.

Sub-optimal heuristic solutions to maximize performance utility are also discussed herein, where tenants are assigned network resources by direct user admission control, slice routing, and resource allocation. The ANS solution is specifically tailored for the challenging UACS channel characteristics, where spectral bandwidth is limited and transmission delay is high.

Comprehensive use-case driven numerical evaluations have been conducted to verify the robustness of the ANS solution. Furthermore, the numerical evaluations compare network performance using the ANS solutions discussed herein with conventional SDN resource allocation schemes in UACS.

As defined herein, an underwater acoustic communications system (UACS) can include at least one controller that is positioned on or near a surface of a water body and several nodes that are positioned within the water body. The nodes can communicate with each other and the controller via acoustic communications.

As defined herein, an underwater acoustic link (UAL) is an acoustic channel, link, edge, or connection between any two nodes or between any node and a controller.

As defined herein, underwater acoustic automatic network slicing (UAANS) refers to embodiments for nominating routes for a given slice request and selecting the best nominated route given utility and congestion constraints. UAANS may sometimes be referred to herein as the ANS solution or ANS algorithm.

As defined herein, service level agreement (SLA) defines performance criteria for a slice request.

Acoustic communications technology existing in the physical layer technology of underwater networks offer relatively low data rate (e.g., 10 kbps) at relatively high-range (e.g., 10 km) communications links. Acoustic waves propagation in the underwater environment is extremely challenging and requires special signal processing and network design considerations. Therefore, the automatic slicing of network resources must be tailored specifically considering the characteristics of the underwater acoustic link (UAL). UALs suffer from severe path loss, time varying multipath propagation, and high propagation delay. The acoustic path loss is mainly caused by wave spreading and absorption. UALs are frequency (f) and distance (d) dependent. The UAL can be generally expressed (in dB) as follows, $$PL(f, d) = \kappa \log d + \alpha(f)d, \quad (1)$$

where, $\kappa$ is the spreading factor with $\kappa=10$ for cylindrical transmission and $\kappa=20$ for spherical transmission, d is the transmission distance, and $\alpha(f)$ is the absorption coefficient, based on Thorp's model. The performance of the UAL is also affected by the multipath propagation. The acoustic wave absorption increases with transmission frequency increase, limiting the operative transmission bandwidth. The UAL bandwidth also depends on the acoustic noise N (f) at the receiver end. Considering link attenuation and noise, the link bandwidth can be referenced in terms of frequency. Thus, the optimal frequency band with maximum signal to noise ratio (SNR) depends on the transmission range, and that the transmission bandwidth decreases rapidly for long range communications. Therefore, multi-hop communication can be more energy efficient for underwater acoustic communications. The SNR can be expressed as, $$\gamma = P_{ac} - PL - N, \quad (2)$$

where $P_{ac}$ is the spectral density of the acoustic transmission power in dB re $\mu Pa^2/Hz$ @ 1 m, PL is the path loss, and N is the noise level. $P_{ac}$ is computed from electrical power, $P_{elec}$, and conversion efficiency $\eta_{e/s}$ as follows:

$$P_{ac} = P_{elec} + 170.8 + \log\left(\eta_{\frac{e}{s}}\right), \quad (3)$$

The frequency dependent link capacity is expressed by the Shannon theorem as, $$C(\gamma) = \int_{BW} \log_2\left(1 + 10^{\gamma/10}\right) df, \quad (4)$$

FIG. 1 shows the achievable rates for different transmission powers and frequency spectra versus transmission distance. As transmission distance increases, low frequency transmission becomes more efficient. Assumptions can be made that the modulation and coding scheme (MCS) has a performance gap of $\eta$ dB relative to the Shannon limit (e.g., a reliable transmission (error probability→0) at the rate $$R = C(\gamma - \eta), \quad (5)$$

where $\eta$ has typical values $\eta \in (0, 10)$ dB with low multipath effects (in deep water) and $\eta \in (5, 20)$ dB for strong multipath in shallow water).

Sound speed depends on the temperature, salinity, and pressure, which vary with underwater depth and location. Thus, sound speed varies at different sea depths. For simplicity, assume that the propagation speed is fixed at c=1500 m/s. The time delay is therefore expressed as, $$T = \frac{d}{c} + \frac{b}{R}, \quad (6)$$

where b is the packet size in bits.

Figure 2:
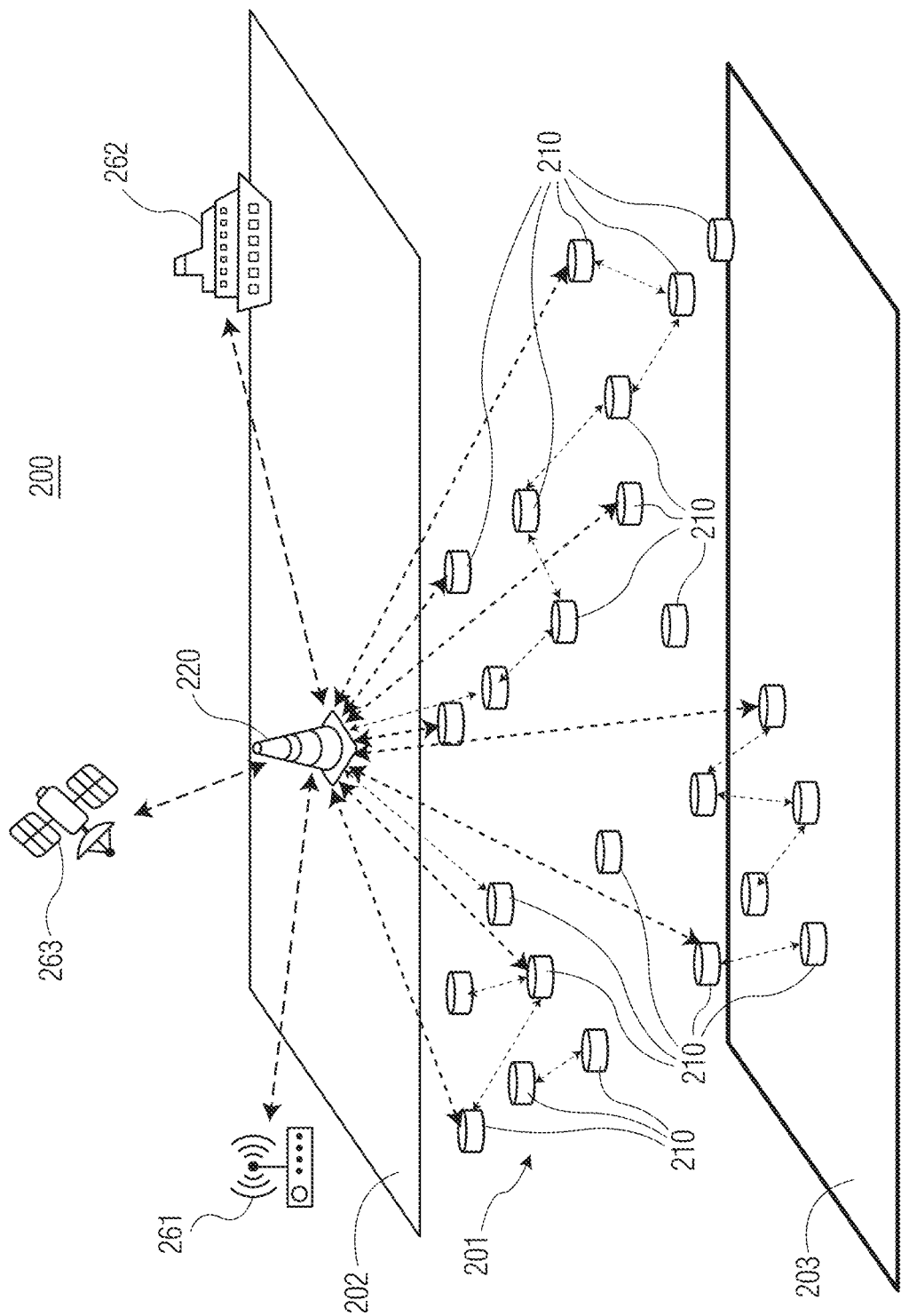
FIG. 2 is schematic illustration of data acquisition of a surveyed medium to generate an image of the medium from the observed data according to an embodiment.

FIG. 2 shows an illustrative underwater acoustic communication system (UACS) 200 according to an embodiment. UACS 200 can be tasked to provide communications to a range of applications, such as ecological sensing, exploration activities, industrial needs, subsurface drone or submarine activity, underwater living vessels, etc. UACS 200 can include nodes 210 that are distributed throughout water body 201, which may be fresh or salt water, and which is bounded by water surface 202 and ground surface 203. UACS 200 may include controller 220, which may be a device capable of transmitting acoustic signals to and receiving acoustic signal from nodes 210. For example, controller 220 may be included in a buoy, surface station, or a surface vessel. Controller 220 can communicate with terrestrial devices such as surface nodes 261 and 262 and can communicate with aerial nodes (such as planes or drones) or geosynchronous nodes such as satellite 263 using electromagnetic communications (e.g., RF). Nodes 210 may be able to communicate with each other via acoustic signals. Controller 220 and nodes 210 may collectively form an underwater network for underwater acoustic communications. In the illustration of FIG. 2, two different UALs are used: K={k1, k2}, each with distinct features (e.g., so that they can provide different link quality-distance trade-offs). For example, consider a pair of 30 kHz and 300 kHz frequency UALs. The 300 kHz band can provide 100s of kbps at short ranges (up to 100s of meters), and the 30 kHz band can provide several kbps at long ranges (up to several kilometers). K1 UALs are delineated by longer distance UALs shown as dotted lines between nodes 210 and controller 220 and K2 UALs are delineated by shorter distance UALs shown with dotted lines existing between nodes 210.

The underwater communications network can be based on software defined networking architecture and controller 220 can control UACS management. Controller 220 is aware of the network state by periodically collecting information, such as locations of the node 210, channel state information (CSI), traffic, link loss/recovery, etc. Based on collected information, and required communication services, controller 220 can make decisions on admission control, routing, and resource allocation, in benefit of selected applications to fulfill their SLAs. Its decisions are delivered to the nodes. Among other tasks, controller 220 is responsible for mobility management, session establishment, traffic management, and network virtualization. In addition to UACS management, controller 220 can operate as a gateway connecting underwater data traffic to terrestrial networks. A network slice can be deployed over multiple operators and span across multiple parts of the network. Therefore, a slice may comprise shared resources from the underwater network and other networks over the sea surface such as aerial and cellular networks, connecting end-to-end terminals. Embodiments discussed herein focus on the resource slicing and allocation for underwater networks. Although shared resources include processing/transmission power, memory storage, and spectral bandwidth, embodiments discussed herein focus on optimizing bandwidth (resource block) allocation and slicing, as it is the main limiting factor for a UACS.

Network capabilities, such as data rate, latency, reliability, and security, are provided to the network tenants/users based on SLA. The transmission latency and rate are optimized with constraint on the transmission power and bandwidth. Link reliability is considered inherently through modulation and coding scheme parameter as in equation (5).

To build a network that can automatically serve multiple underwater communication and sensing applications, the network resources can be managed based on high-level SLA requirements. For each network slice, s, an application specifies a set of performance metrics that should be maintained for a transmission from a source node $v_{sre}$ to a destination node Vast. The SLA requirements can include slice priority, $w_s \in [0, 1]$, target and threshold rates ($R^t$, $R^{th}$), target and threshold time delays ($T_s^t$, $T_s^{th}$), and weights for the rate and time delay significance ($w_{s,r} \in [0, 1]$, $w_{s,t} = 1 - w_{s,r}$).

Figure 3:
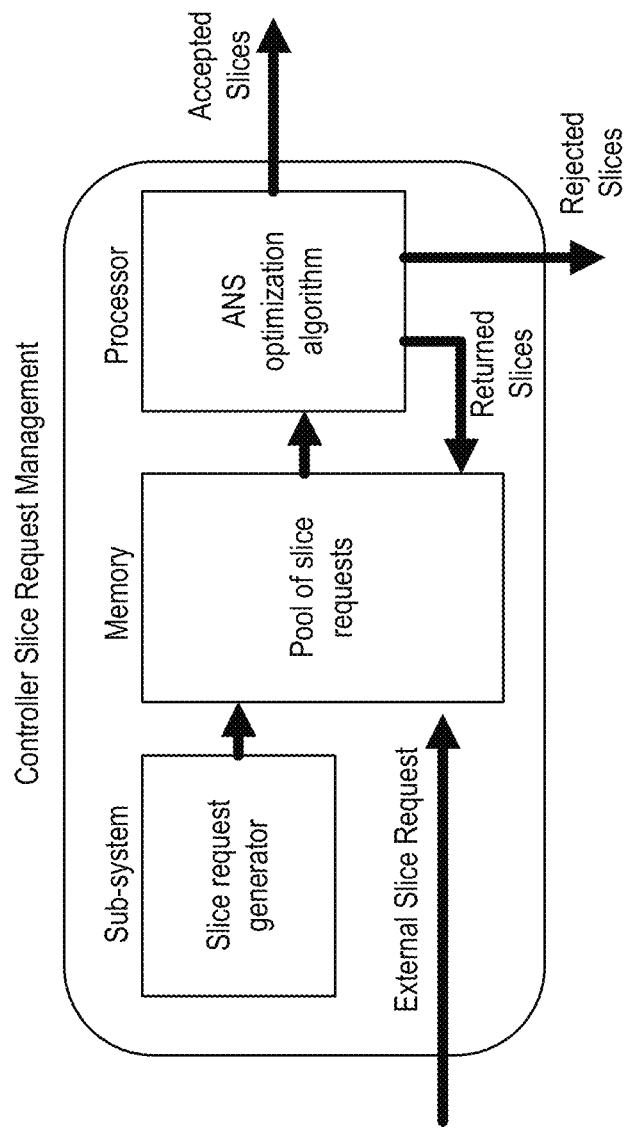
FIG. 3 shows an illustrative block diagram of a slice request manager being implemented in a controller according to an embodiment.

As shown in FIG. 3, a slice request is initiated or received at the controller (e.g., controller 220), to select routing path and allocate network resources for that slice. A slice request for automatic, predictable, or periodic traffic may be generated by the controller. Typically, the slice requests are externally sent through the in-band control channels. The slice request can be generated at the source node (e.g., one of nodes 210) or by other nodes (possibly over a terrestrial network) to request data collection. Assuming independent slice requests, the number of new slice requests over the slice evaluation period $T_0$ can be modelled using Poisson distribution with an average number of requests, λ. At the end of the slice evaluation period, the controller can process all the slices that are stored in its memory by running the ANS optimization algorithm. The treated slices are 1) accepted and provided with routing path and resources, 2) returned to the controller memory to be re-evaluated at the next slice evaluation period, if a threshold slice waiting time is not exceeded, or 3) rejected if the threshold slice waiting time is exceeded after waiting for one or more slice evaluation periods.

Figure 4B:
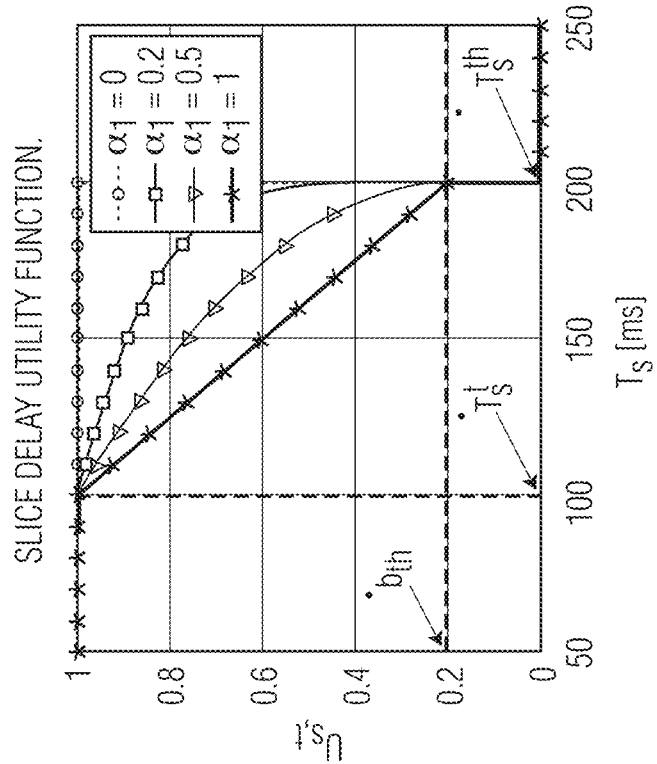
FIG. 4B shows an illustrative slice delay utility function.
Figure 4A:
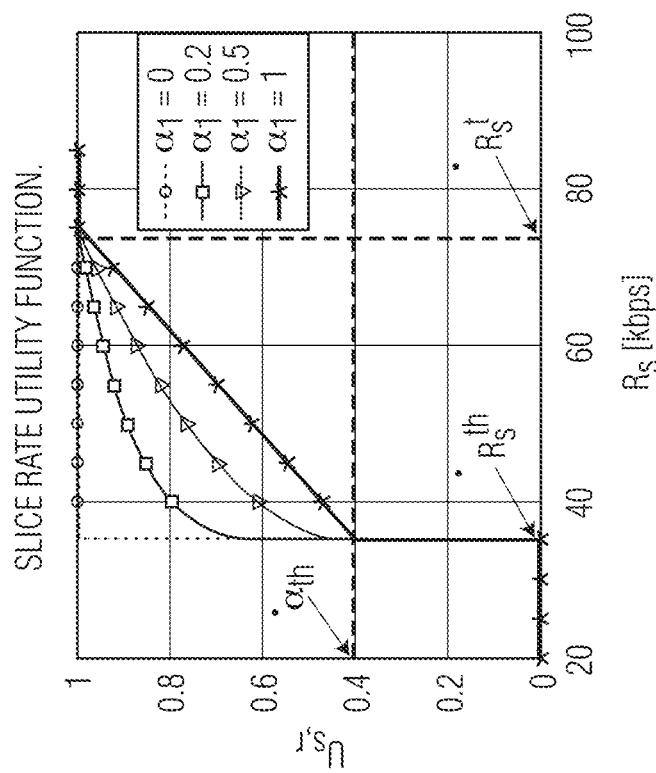
FIG. 4A shows an illustrative slice rate utility function.

The slice evaluation period, To is preferably short to guarantee acceptable resource allocation delay, but long enough to allow joint route evaluation over large number of slices. The objective of the ANS algorithm is to select the optimal routing paths and allocate network resources in a way that maximizes the number of served slices while offering a service that is as close as possible to the target requirements, but also within the threshold SLA requirements. A utility function that achieves this ANS objective can be defined as $$U = \sum_s A_s w_s u_s, \qquad (7)$$

where, $$u_s = w_{s,r} u_{s,r} + w_{s,t} u_{s,t}, \qquad (8)$$

where $A_s \in \{0,1\}$ (9) indicates the acceptance of the slice, s, with $A_s = 0$ if the slice is rejected, and $A_s = 1$ otherwise. $u_s$, $u_{s,r}$, and $u_{s,t}$ denote the slice utility, the slice rate utility, and the slice time-delay utility, respectively. The satisfaction level is sub-modular with the slice rate and time-delay performance. Therefore, to practically reflect the satisfaction level in the utility function, concave non-decreasing functions are used to model the slice time-delay utility, expressed as:

$$u_{s,r} = \begin{cases} 0 & R_s \leq R_s^{th} \\ a_{th} + (1 - a_{th}) \left( \dfrac{R_s - R_s^{th}}{R_s^t - R_s^{th}} \right)^{\alpha_1} & R_s^{th} \leq R_s \leq R_s^t, \\ 1 & R_s^t \leq R_s \end{cases} \qquad (10)$$

$$u_{s,t} = \begin{cases} 0 & T_s^{th} \le T_s \\ b_{th} + (1-a_{th})\left(\dfrac{T_s^{th} - T_s}{T_s^{th} - T_s^t}\right)^{\alpha_2} & T_s^t \le T_s \le T_s^{th}, \\ 1 & T_s \le T_s^t \end{cases} \quad (11)$$

where, $R_s$ and $T_s$ represent the achieved slice rate and time delay, and are derived based on the joint route selection and resource allocation for all slices, as discussed below. The parameters $\alpha_{th}$, $b_{th}$, $\alpha_1$, and $\alpha_2$ are given in the SLA to determine the threshold satisfaction and concavity of the curves, as shown in FIGS. 4A and 4B.

The network can be represented as a graph, G(v, E), with $v \in v$ denoting any node in the network (including the controller) and $\varepsilon v$, $v' \in \varepsilon$ denoting the edge connecting the transmitter v to the receiver v' over the spectral band $k \in K$. The controller can be aware of the locations of all the nodes and of the environment characteristics.

Consider a slice, s that has a route from the source node $v_0^{(s)} = v_{src}^{(s)}$ through a sequence of intermediate nodes $v_1^{(s)} \ldots v_{n-1}^{(s)}$ to the destination node $v_n^{(s)} = v_{dst}^{(s)}$, where $\{v_j^{(s)}\}$, $j \in 0$, $n^{(s)}$ is a set of all the nodes in the slice s. The v can be thought of as a network address of a node. Then $V_j^{(s)}$ is an address of the j-th hop of the slices (s) connecting the node src to the node dst. The slice rate $R_s$ and delay $T_s$ can be calculated as:

$$R_s = \min_{j \in \{1,n\}} \sum_{k \in K} R_{v_{j-1}, v_j, k} x_{v_{j-1}, v_j, k}^{(s)}, \quad (12)$$

$$T_s = \sum_{j \in \{1,n\}} T_{v_{j-1}, v_j} \quad (13)$$

where $x_{v_{j-1}, v_j, k}^{(s)} \in [0,1]$ indicates the percentage of edge resource allocation to the slice s, and $R_{v_{j-1}, v_j, k}$ and $T_{v_{j-1}, v_j, k}$ are achievable transmission rates and delays from node $v_{j-1}$ to node $v_j$ through band $k \in K$, as expressed in (5) and (6). The route shall have no loops, as expressed below:

$$\forall j \ne j' : v_j \ne v'_j. \quad (14)$$

In order to prevent overuse of UALs beyond the capacity limitation and overuse of nodes' power resource, the constraints defined in equations 15 and 16 are introduced:

$$\forall v, v', k : \sum_s x_{v,v',k}^{(s)} \le 1, \quad (15)$$

$$\forall V : \sum_{s,k} P_{v,k}^{(s)} = P_v \le P_{max}. \quad (16)$$

Finally, a slice should be rejected if the threshold SLA requirements are not achievable, in order to reserve network resources for other slices. Hence, $$R_s \ge A_s R_s^{th}, \quad (17)$$

$$A_s T_s \le T_s^{th}. \quad (18)$$

The automatic network slicing (ANS) problem can be mathematically represented as follows:

$$\max_{A_s, \{v_j^{(s)}\}, x_{v_{j-1}, v_j, k}^{(s)}} U, \quad (19)$$

$$\text{subject to} : A_s \in \{0, 1\}, \, x_{v_{j-1}, v_j, k}^{(s)} \in [0, 1] \quad (14) - (18)$$

The optimization problem is a mixed integer non-linear program (MINLP), which is a nondeterministic polynomial time problem to solve. Such problems are very difficult to solve. In order to solve the ANS problem described in (19), a systematic (heuristic) solution can be used. To simplify the complexity of the systematic solution, the slicing problem is decoupled into (1) a routes nomination and elimination sub-problem, and (2) a resource allocation sub-problem, as described below.

FIG. 5 shows an illustrative process for solving automatic network slicing for an underwater acoustic communications system according to an embodiment. The underwater acoustic communications system can include a controller positioned at or near a surface of a water body and a plurality of nodes that are distributed throughout the water body, wherein the controller and plurality of nodes have bidirectional acoustic communications capability to establish underwater acoustic links (UALs), where the UALs can include first UALs and second UALs, wherein the first and second UALs have different rate and range characteristics (e.g., the k1 and k2 UALs as discussed in conjunction with FIG. 2). Starting with step 510, a slice request can be received, wherein the slice request includes a source and a destination, wherein the source and destination are selected from the controller and the plurality of nodes, and wherein the sliced request is associated with service level agreement (SLA). The SLA requirements can include priority, slice rate target, slice rate threshold, slice time delay target, slice time delay threshold, and importance of the slice rate with respect to importance of the slice time delay. The received slice request can be added to a pool of slice requests in step 515. These slice requests are managed as discussed above in connection with FIG. 3.

At step 520, for each slice request in the pool of slice requests, all routes that exist between the source and the destination that satisfy the SLA requirements are nominated. All possible routes for each slice are nominated as potential routing solutions and all routes that do not meet the ANS problem constraints are eliminated. At this stage, routes nomination is done for each slice separately. Based on the UAL characteristics discussed above, restricting the number of transmission hops, which leads to higher transmission distances per hop, decreases the achievable rates per UAL and total traffic carried over the UACS. Propagation delay can only increase by adding more transmission hops as compared to direct transmission from any node to the destination node, as the total propagation distance increases. As a result, slices with low time-delay SLA requirement are expected to have low number of hops, while slices with high data rate SLA requirement are expected to be delivered over higher number of hops.

Route nomination is performed as described in FIG. 6, which shows illustrative steps according to an embodiment. Starting with step 610, a first table comprising next-hop UAL rate and time delay characteristics for the plurality of nodes can be generated. The next-hop (i.e., first) table can include, for each node, a next-hop link rate and delay to each neighboring node. For example, referring to FIG. 7A, which shows an illustrative UACS 7000 including nodes 7001-7012, assume node 7001 is the node of interest. Node 7001 is surrounded by nodes 7002-7012 and the table will include next-hop link rate and delay from node 7001 to each nodes 7002-7012. The table will also include entries showing next-hop rate and delay from Node 7002 to nodes 7001 and 7003-7012, and so on for each node. The next-hop table is shown in Table I. The values $R_{v,v',k}$ and $T_{v,v',k}$ are calculated as in (5) and (6) for all $\forall v \in v$, $k \in K$, respectively. The entries in the table can be sorted in any suitable manner. For example, for each node, the entries can be sorted according to hop-link rates.

TABLE I

| $\varepsilon_{v, v', k}$ | $R_{v, v', k}$ | $T_{v, v', k}$ |
|---|---|---|
| . | . | . |
| . | . | . |
| . | . | . |

Referring back to FIG. 6, at step 620, a second table of incomplete potential routes is created at each hop count, until a maximum number of hops, H is reached. Such a table is shown in Table II. These tables are filled based on elimination and nomination rules. The second table can be filled by accessing the first table for the next-hop UAL rate and time delay characteristics to build incomplete potential routes for each h-hop, where h-hop denotes the number of hops in a potential route, and wherein the h-hop does not exceed the maximum hop count (as shown in step 622) and potential routes can be added to the second table if rate and time delay of a potential route satisfies the SLA requirements (as shown in step 624). In Table II, $R^r$ and $T^r$ denote the rate and time-delay, respectively, for data delivery from the source, throughout the incomplete route, till the current last node. $R_s^{\to v_{dst}}$ and $T_s^{\to v_{dst}}$ denote the achieved slice rate and time-delay, respectively, assuming direct delivery from the last node in the incomplete route to the destination.

TABLE II

| Route | $R^r$ | $T^r$ | $R_s^{\to v_{dst}}$ | $T_s^{\to v_{dst}}$ |
|---|---|---|---|---|
| . | . | . | . | . |
| . | . | . | . | . |
| . | . | . | . | . |

At step 630, if a potential route contained within the second table includes the destination, that potential route is added to a third table comprising nominated routes. A table of nominated routes is shown in Table III. The rules for route elimination and nomination are as follows: Rule 1: Next hop neighbors are defined as $R_{v,v',k} \geq R_s^{th}$, $\forall v \neq v'$. Rule 2: All the routes to non-neighbor nodes are discarded. An incomplete route is eliminated if $T_s^{V_{dst}} \geq T_s^{th}$, since it does not obtain the slice threshold time-delay requirements. This rule quickly eliminates the routes that go in the direction which is the opposite of the destination node. Rule 3: Revisit of any node in the incomplete route is not allowed. Rule 4: If a direct transmission from the last node in the incomplete route to the destination node achieves the SLA requirements, then the route is added to the table of nominated routes, shown as Table III.

TABLE III

| Route | $R_s$ | $T_S$ |
|---|---|---|
| . | . | . |
| . | . | . |
| . | . | . |

FIG. 8 shows an exemplary algorithm (Algorithm 1), which illustrates an exemplary procedure that may be followed to fill the nominated routes table for each slice, given UALs' capacity, SLA requirements of all slices, and percentage of traffic over all edges by previously allocated slices according to an embodiment. As those skilled in the art understand, Algorithm 1 is merely exemplary and can be modified or changed. Starting from the source node, the first hop incomplete routes table is filled by adding $v_{src} \to$ to the route column. This entry is treated as an incomplete route with zero propagation delay $T^r = 0$ and infinite data rate $R^r = \infty$, because no transmission has taken place yet. The values of $R_s^{\to v_{dst}}$ and $T_s^{\to v_{dst}}$ are calculated as $R_s^{\to v_{dst}} = \min\{R^r, R_{1,v_{dst},k}\}$ and $T_s^{\to v_{dst}} = R^r + T_{1,v_{dst},k}$ with/denoting the last node in the incomplete route and $k \in K$. If $R_s^{\to v_{dst}} \geq R_s^{th}$ and $T_s^{\to v_{dst}} \leq T_s^{th}$, $v_{dst}$ is concatenated to incomplete route to form a complete rout that is added to the nominated routes table. For each route in the v-hop incomplete routes table (e.g., table II), the incomplete route is eliminated and removed from the incomplete routs table if $T_s^{\to v_{dst}} \geq T_s^{th}$. To fill the (h)-th hop incomplete routes table, the fill process starts from the route entries in the (h−1) hop incomplete routes table, and then adds a new node to the incomplete route from the neighbors of the last node in the (h−1) hop incomplete route. The new values of $T^r$ and $R^r$ are expressed as $T^{r,h} = T^{r,h-1} + T_{v,v',k}$ and $R^{r,h} = \min\{R^{r,h-1}, R_{v,v',k}\}$. The procedure is repeated until the (H) hop incomplete routes table is filled or until no more incomplete routes satisfy the SLA requirements.

Figure 7A:
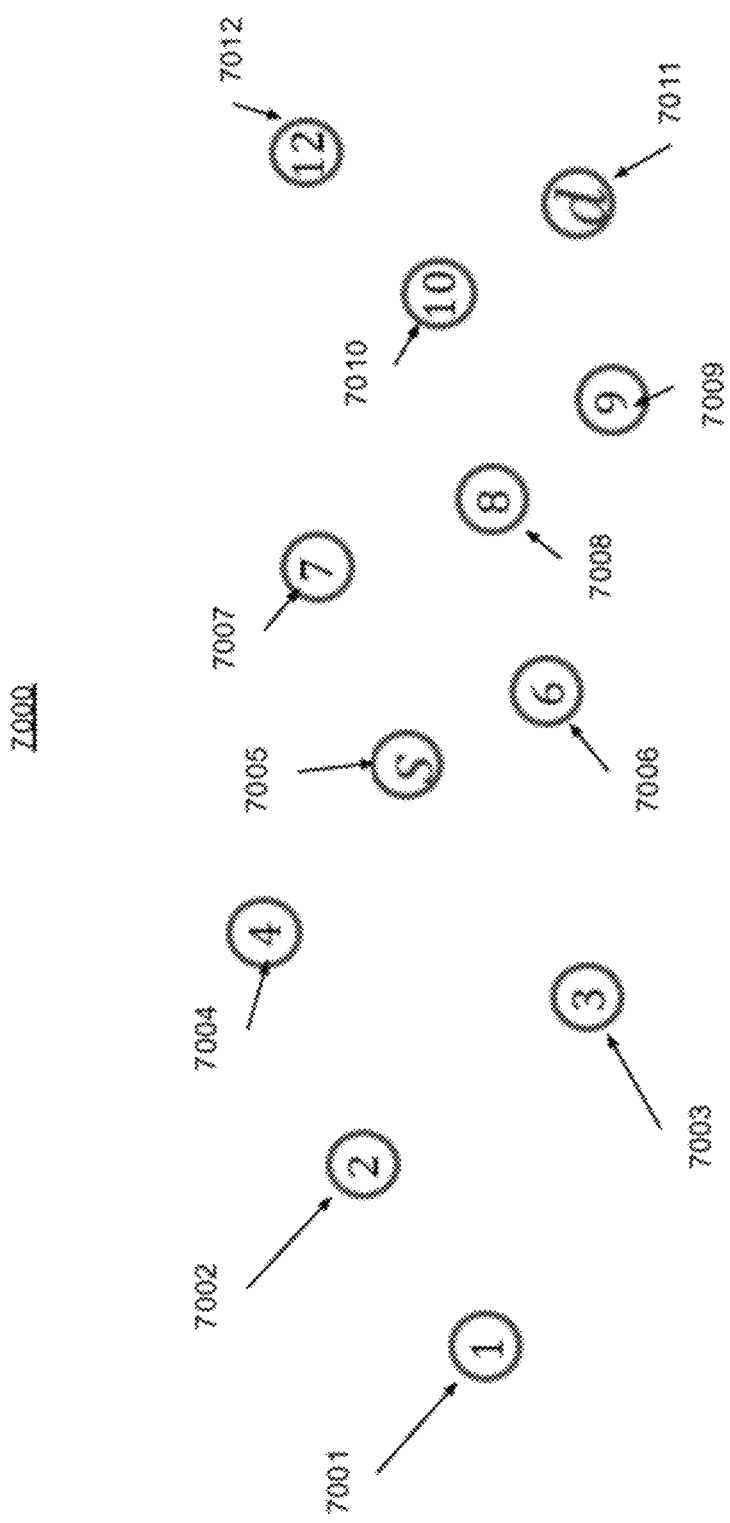
FIGS. 7A-7D show different illustrative node and routing configurations according to various embodiments.
Figure 7B:
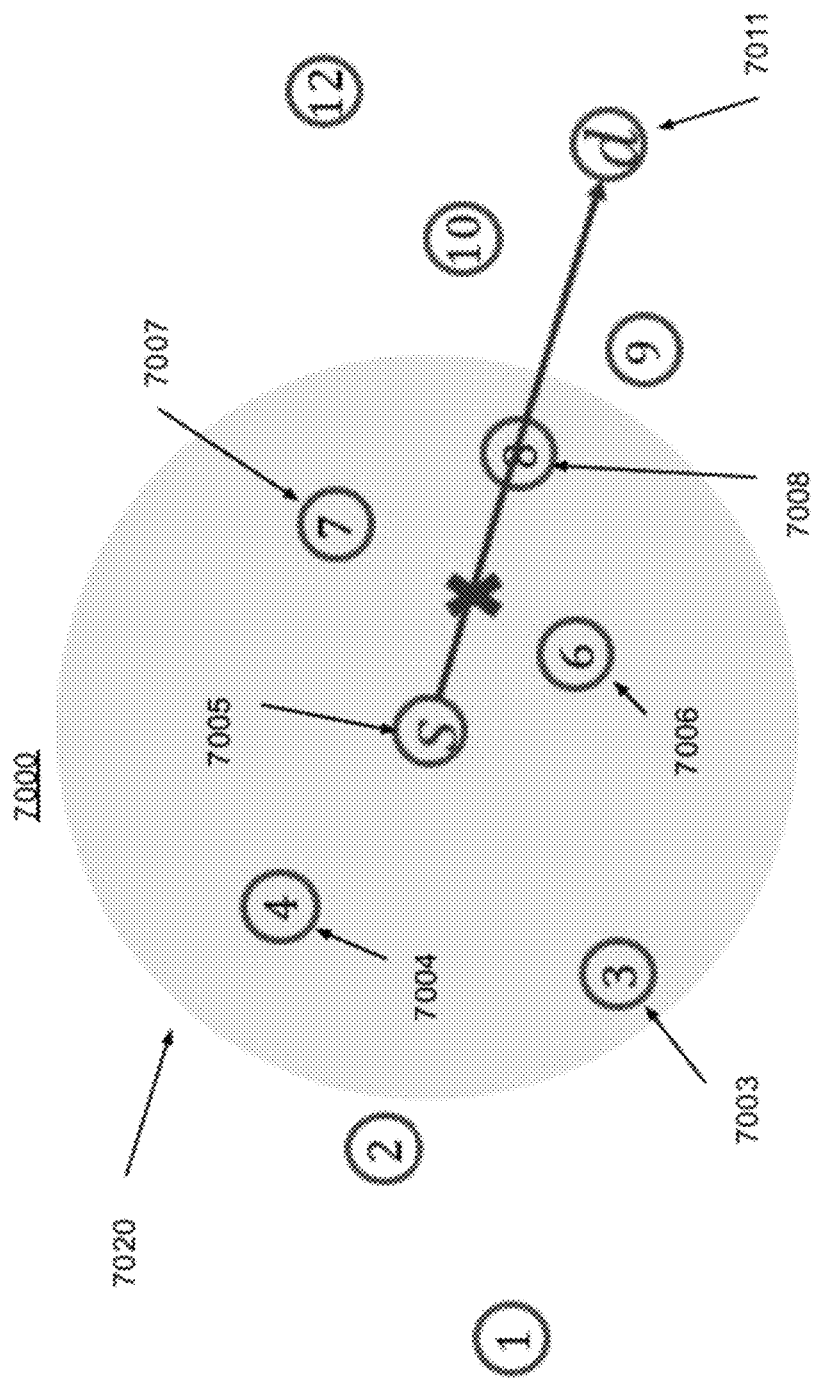
Figure 7C:
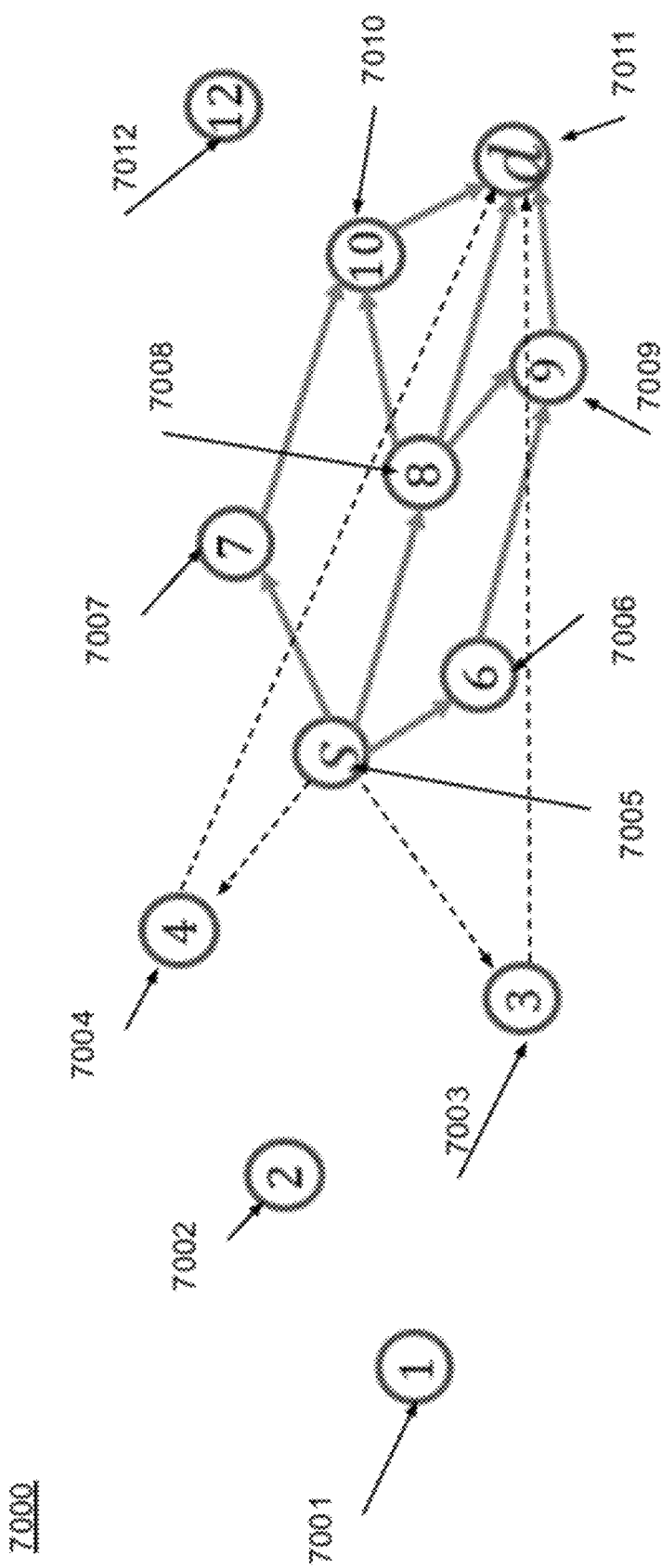
Figure 7D:
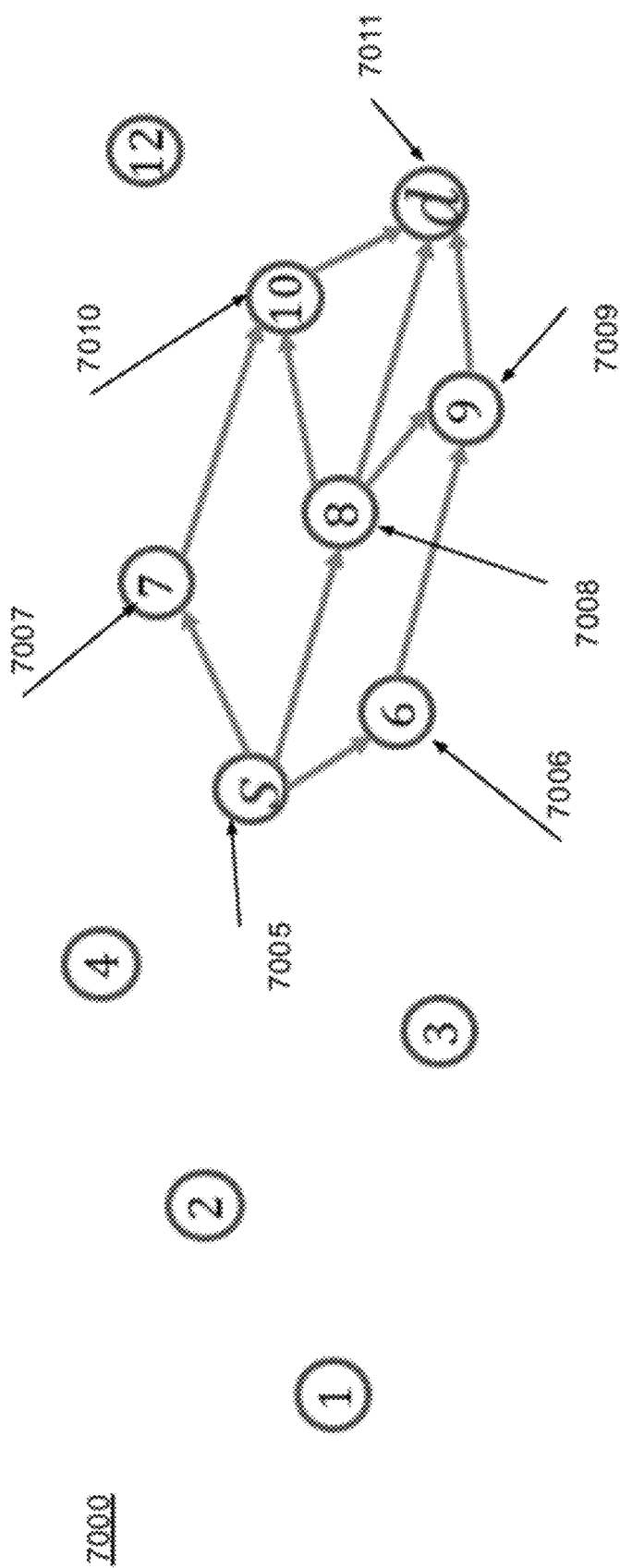

Referring now back to FIG. 7A, application of the route nomination and elimination rules as applied to UACS 7000 is discussed. Source node 7005 is the starting point for determining potential nominated routes to destination node 7011. Applying Rule 1, all neighboring nodes in which data can be transmitted to (from source node 7005) at a data rate that is higher than an SLA defined threshold data rate (e.g., $R_s^{th}$) for that slice (e.g., UAL) are identified. FIG. 7B shows rate threshold circle 7020 that illustrates SLA defined threshold data rate. Thus, based on the SLA data rate threshold, only nodes 7003, 7004, and 7006-7008 qualify as neighboring nodes to source node 7005. Destination node 7011 does not qualify as a neighboring node because the data transmission rate is below the SLA defined threshold. Referring now to FIG. 7C, the time delay is checked by moving from incomplete routes to destination node 7011. If the total time delay is greater than a SLA defined time delay threshold (e.g., $T_s^{th}$), that route is eliminated. In FIG. 7C, routes (denoted by dashed lines) through nodes 7003 and 7004 are eliminated. Routes through nodes 7006, 7007, and 7008 (denoted by solid lines) are saved in the incomplete routes table. With the elimination of the bad routes, only nominated routes remain, as shown in FIG. 7D.

For each slice, the table of nominated routes is filled based on the procedure discussed in FIGS. 6 and 8, while the route selection and resource allocation are performed as a separate process. Note that optimal route selection from nominated routes, and optimal resource allocation leads to an optimal solution. In other words, the optimal routes are not eliminated at this stage.

Returning now to FIG. 5, at step 530, process 500 assesses whether a nominated route for each slice request contained in the pool of slice request balances maximization of a utility function and minimization of congested UALs expected to be used by other slice requests within the pool of slice requests. At step 540, a slice request is rejected if that slice request fails to include a nominated route that balances maximization of the utility function and minimization of congested UALs by returning that slice request to the pool of slice requests. At step 550, a slice request is accepted if that slice request includes a selected nominated route that balances maximization of the utility function and minimization of congested UALs by executing underwater acoustic communications via the UACS in accordance with the selected nominated route for that slice request.

In the routes nomination and elimination process, a number of routes are nominated for each network slice. After route nominations are made, decisions are made whether each slice is accepted or not, one of the accepted nominated routes is selected, and network resources are allocated such that a utility function is maximized. At this stage, the route selection and resource allocation can take other slices' traffic into account. This is done by avoiding routes that are expected to be congested by other slices. After having nominated routes for all slices existing in a pool of slices, a utility value for all nominated routes is generated and a cost value of using an UAL based on that UAL's available capacity and nomination by other slices is also generated.

The slice resource allocation can be done iteratively, depending on the slice priority, $w_s$, to allow for real-time dynamic resource allocation. To serve low priority slices, a slice is evaluated at each iteration randomly with probability $$P_s = \frac{w_s}{\sum_{i \in S} w_i}, \forall s \in S. \quad (20)$$

The controller (e.g., controller 220) has access to all nodes' locations and environment characteristics, the data rate handled by every UAL, $R_{v,v'k}$ can be calculated as in (5). Assuming that some slices are being served, the available data rate at all network UALs for a new slice can be updated as $$\overline{R_{v,v',k}} = R_{v,v',k} - \sum_s R_s \mathbb{1}_{\{\varepsilon v, v', k \in p_s\}}, \quad (21)$$

where $p_s$ is the selected route for the previously selected slices, and $\mathbb{1}_{\{\cdot\}}$ is an indicator that equals one if the argument in brackets is correct, and zero otherwise. The values of $\sqrt{R_{v,v'k}}$ are continuously updated as new slices are served, and old slices are released. Given the nominated routes tables for all slices, the maximum potential use for all network UALs can be calculated, $Y_{v,v',k}$ by summing the nominated routes rates that use that UAL among all network slices, i.e., $$Y_{v,v',k} = \sum_s \sum_{\bar{p}_s \in p_s} R_{v,v',k} - \sum_s R_s \mathbb{1}_{\{\varepsilon v,v',k \in \bar{p}_s\}}, \quad (20)$$

where $p_s$ is the set of all nominated slice routes. The values, $Y_{v,v'k}$ give indication of the network UALs congestion by all slices.

At a given resource allocation iteration, a slice selected to evaluate the optimal route selection from the nominated routes table for that slice. Based on the current UAL's data-rate availability, the achievable slice rate $R_s$ for each nominated route is updated. Nominated route is removed if the updated $R_s < R_s^{th}$. If all nominated routes are removed, the slice is rejected. Otherwise, a route $p(\overline{R_s})$ is selected, with $\overline{R_s}$ capacity reserved at all UALs included in that route, as follows. To avoid congested UALs by other slices, a loss function is defined that penalizes the use of UALs with high $Y_{v,v',k}$ relative to the available UAL capacity as, $$L(\overline{R_s}) = \sum_{\varepsilon \in \mathcal{E}} \left( Y_{v,v',k} - \overline{R_{v,v',k}} \right)^+ + \left( \frac{\overline{R_s}}{\overline{R_{v,v',k}}} \right), \quad (23)$$

where, $(\cdot)^+ = \max\{0,\cdot\}$. To this end, a route is selected from the nominated routes table such that, $$\underset{p \in p}{\operatorname{argmax}} \ U_s(\overline{R_s}) - w_c L(\overline{R_s}), \quad (24)$$

where $U_s(\overline{R_s})$ is the slice utility function, as defined in (8), $\rho$ denotes all nominated routes, and $w_c$ is a weight constant to balance slice utility and congestion avoidance, such that following slices are well-served. The procedure above is repeated for all slices. FIG. 9 shows an exemplary algorithm (Algorithm 2), which illustrates an example procedure of the resource allocation process, according to example embodiments. As those skilled in the art understand, Algorithm 2 is merely exemplary and can be modified or changed.

It should be understood that the steps shown in FIGS. 5 and 6 are merely illustrative and that additional steps may be added, steps may be omitted, or steps may be rearranged in the order in which they are executed.

Figure 10B:
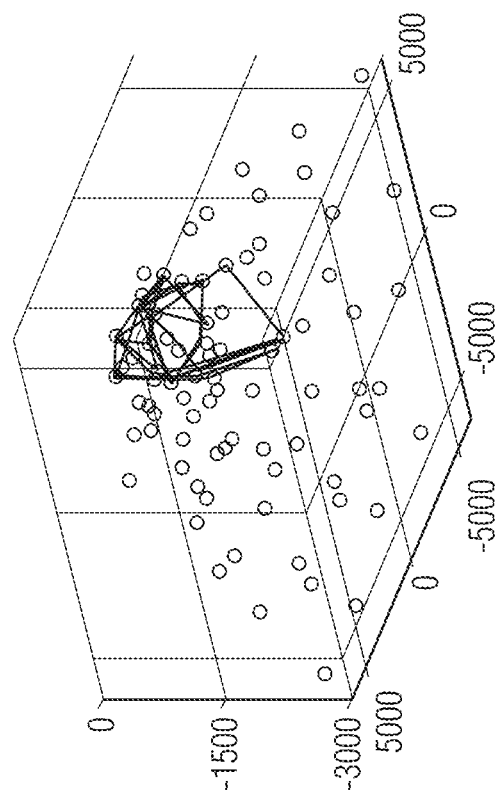
FIGS. 10A and 10B show different nominated route results for an illustrative underwater acoustics communications systems network including a controller and several nodes according to an embodiment.
Figure 10A:
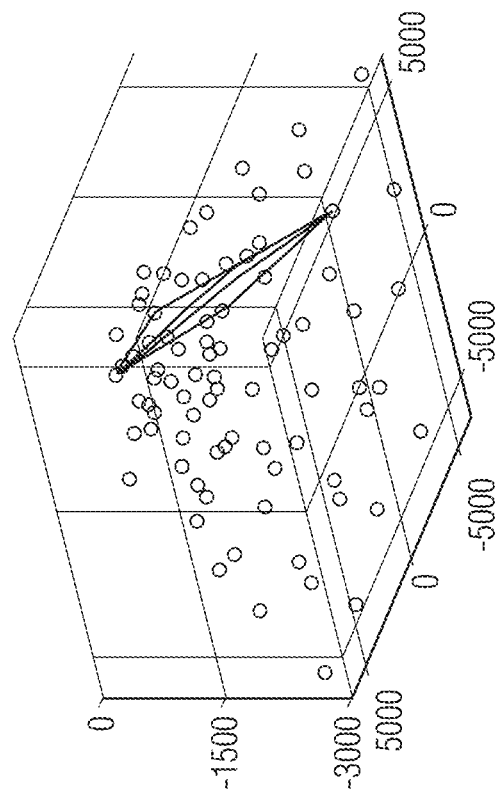

The application of route nomination, route selection, and resource allocation and the performance achieved as applied to UACS scenarios using the underwater acoustic signaling ANS embodiments discussed herein are now examined. FIGS. 10A and 10B shows a UACS platform including one controller and 80 underwater nodes, which are distributed over a pyramid of 2700 m height and 3500 m base radius. FIGS. 10A and 10B show illustrative nominated routes for management and network orchestration and sensing and monitoring, respectively. The controller is positioned at the top of the pyramid and at the water surface. The density of nodes may be higher closer to the water surface, to support the higher data demands at the nodes close to the controller. A random offset can be added to the location of each node, to account for underwater node drifting due to water currents. The ANS embodiment and the simulation account for nodes mobility through an additional nodes position offset that is added over time at each slice evaluation iteration. The UACS and the underwater acoustic signaling ANS embodiment are simulated using Matlab. A Poisson distributed number of slice requests with an average $\lambda$ are generated during each slice evaluation period. The slice type, and terminals are randomly selected from a predefined set of slice types and nodes. At each slice evaluation iteration, the underwater acoustic signaling ANS algorithm is performed to grant network admission and resources to a subset of slice requests that are in the slices pool. Average performance is obtained by running the simulation for a relatively large number of slice evaluation iterations (e.g., more than 1000 iterations). The maximum slice admittance delay is equal to one slice evaluation period; non-admitted slices are removed from the slices pool and rejected. Unless otherwise mentioned, the default system parameters are shown in Table IV.

TABLE IV

Default system parameters.

| Parameter | Value | Parameter | Value |
|---|---|---|---|
| $\alpha_1$ | 0.5 | $\alpha_2$ | 0.5 |
| $a_{th}$ | 0.3 | $b_{th}$ | 0.3 |
| $\lambda$ | 80 | reserve period | 5 |
| $w_c$ | $10^{-8}$ | $L_A$ | 50% |
| $P_{elec}$ | 1 [W] | $\eta_{e/s}$ | 80% |
| tx. band $k_1$ | [2, 12] kHz | tx. band $k_2$ | [20, 60] kHz |
| $\kappa$ | 1.5 | packet size, b | 1000 bits |

In Table IV, $a_{th}$, $b_{th}$, $\alpha_1$, and $\alpha_2$ are the utility function parameters. A is the rate of slice requests at each slice evaluation period. The reserve period is the number of slice evaluation periods over which resources are given to admitted slices, $w_c$ is a constant to balance slice utility and congestion avoidance. $L_A$ is a percentage representing remaining link availability after considering practical issues, such as modulation and coding, and MAC layer efficiency. The rest of the parameters are related to the transmission and environment characteristics. N is noise and $\alpha(f)$ absorption coefficient.

Four types of slices are considered: (1) management and network orchestration (MANO), (2) emergency communication (EC), (3) automation and communication (AC) (4) sensing and monitoring (SM). Table V summarizes the slice types and their corresponding SLA requirements.

TABLE V

SLA types and parameters.

| Slice type | MANO | EC | AC | SM |
|---|---|---|---|---|
| Priority, $w_s$ | 0.3 | 0.4 | 0.2 | 0.1 |
| $R_s^t$, $R_s^{th}$ [kbps] | 30, 10 | 70, 35 | 200, 100 | 150, 75 |
| $t_s^t$, $t_s^{th}$ [s] | 0.1, 0.2 | 0.1, 0.2 | 0.2, 1 | 0.7, 1.2 |
| $w_{s,r}$, $w_{s,t}$ | 0.2, 0.8 | 0.2, 0.8 | 0.5, 0.5 | 0.8, 0.2 |

Note that the threshold and target time delay are defined as:

$$T_s^{th} = t_s^{th} + T_s^{min}$$
$$T_s^{t} = t_s^{t} + T_s^{min},$$

where, $$T_s^{min} = \frac{d_{v_{src}, v_{dst}}}{c} + \frac{b}{R_s^{th}}$$

is the minimum possible time delay for transmitting data over the distance $d_{v_{src}, v_{dst}}$ and $t_s^{th}$ ($t_s^{t}$) are the acceptable threshold (target) delays, caused by multi-hop retransmissions. Notice how, unlike terrestrial networks, the required delay is highly dependent on the distance between the source and destination in the UACS. The SLA time delay requirements are defined in this way to avoid extremely large and unnecessary delay for short-range transmissions, but also allow long-range transmissions. For the MANO and EC slice types, low data rate is required, as the traffic generated by these slices is small. However, these slices should be transmitted with minimum delays and high priority. Furthermore, it is assumed that the controller is either the source or the destination for the MANO and EC slices. The AC slice type is transmitted between any two nodes in the network, while the SM slice type is transmitted directly or indirectly (through multiple slices) toward the controller. For the AC and SM, high data rates are required to transmit the relatively large amount of data, but the time-delay tolerance is high, compared to the MANO and EC slice types. For transmissions between underwater nodes and terrestrial/aerial nodes, communication is established through the controller, which acts as a gateway for the underwater network. The communications between the controller and terrestrial/aerial nodes are managed by other systems. The utility function parameters, and the slice reservation period are fixed for all slice types, as shown in Table IV, to simplify the presentation of system analysis, and present unbiased conclusions. The simulation can be adjusted to consider different values that might reflect a given practical scenario.

Figure 11A:
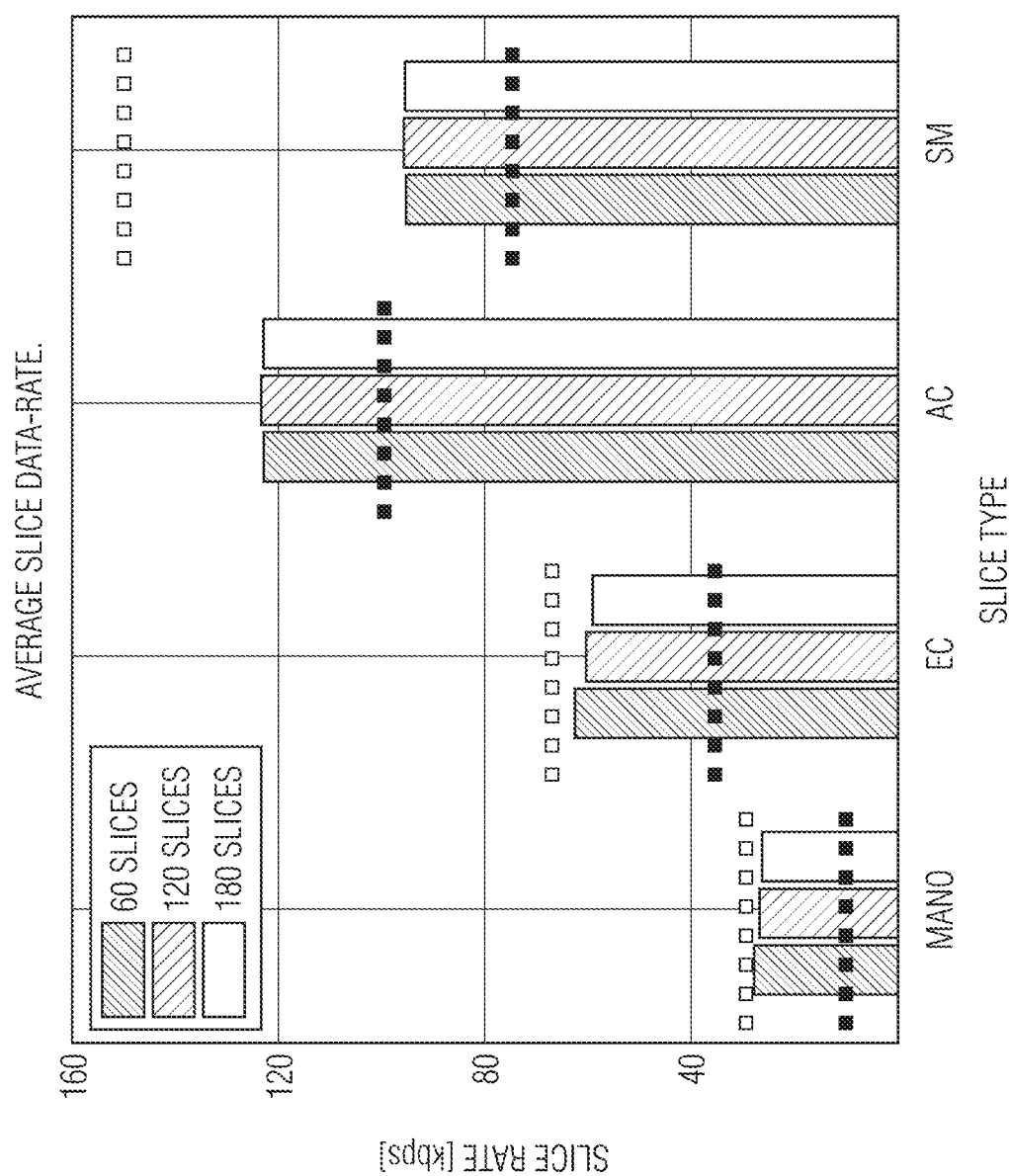
FIGS. 11A and 11B show the slice rates and time-delays, respectively, for different slice types and number of slices according to various embodiments.
Figure 11B:
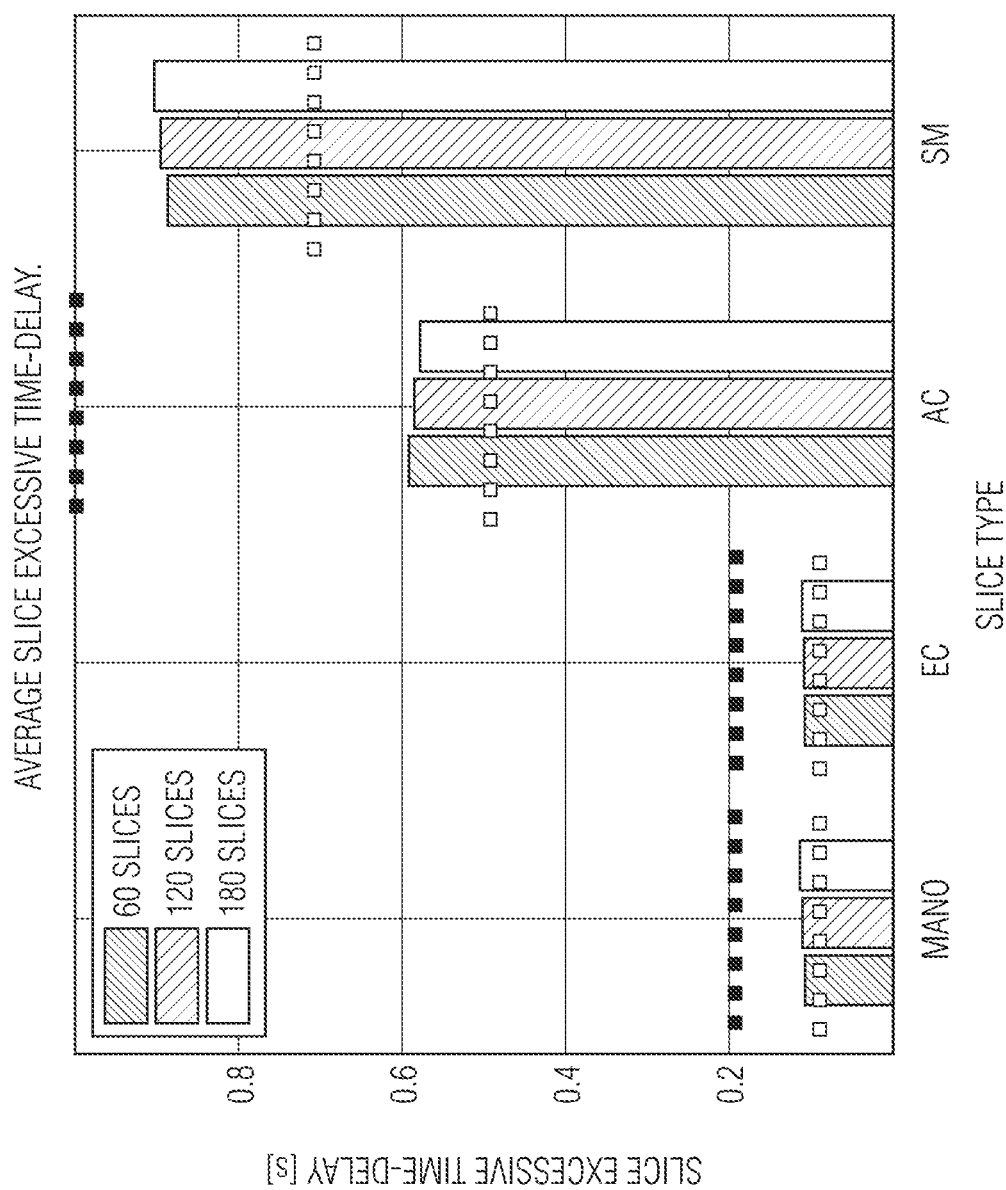
Figure 12:
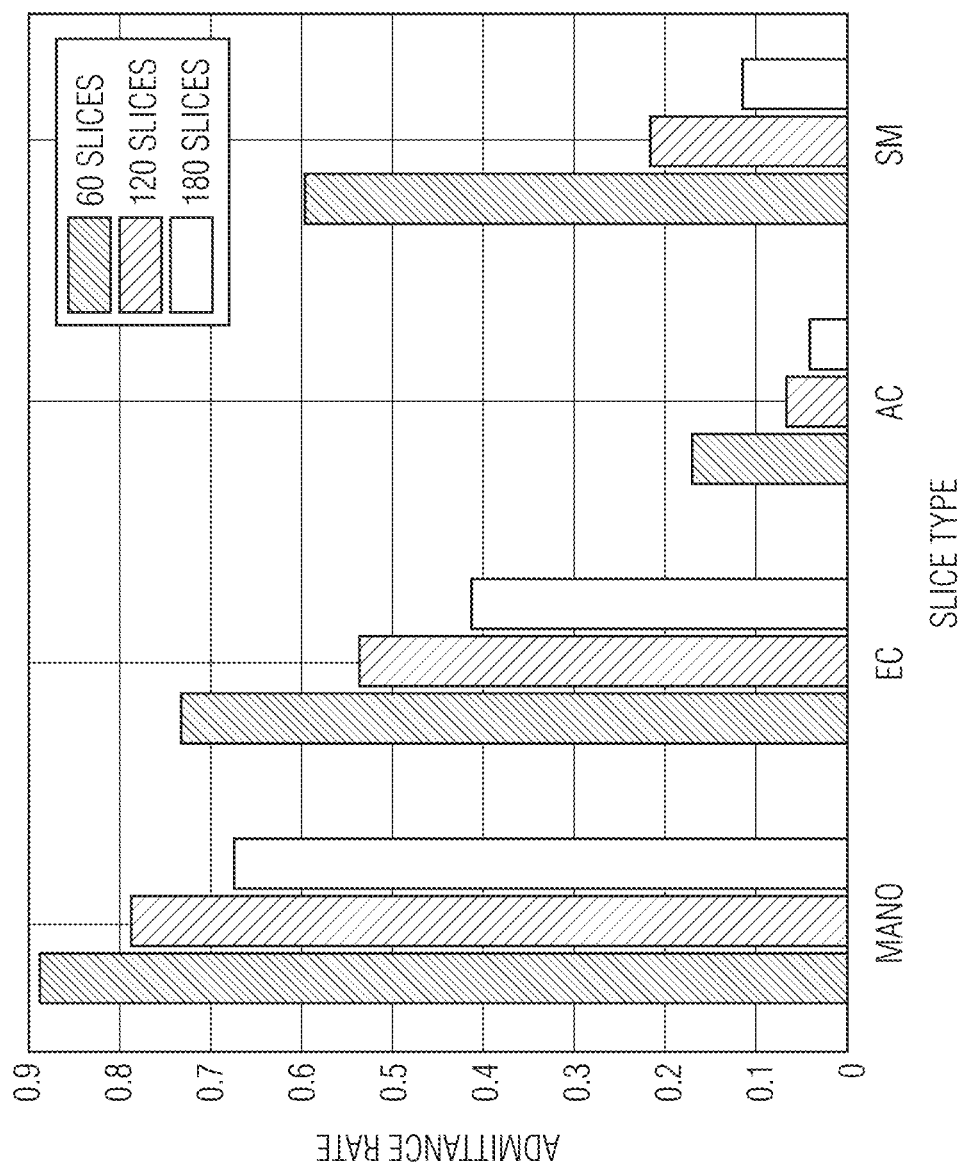
FIG. 12 shows admittance rate versus slice type and number of slices according to an embodiment.
Figure 13A:
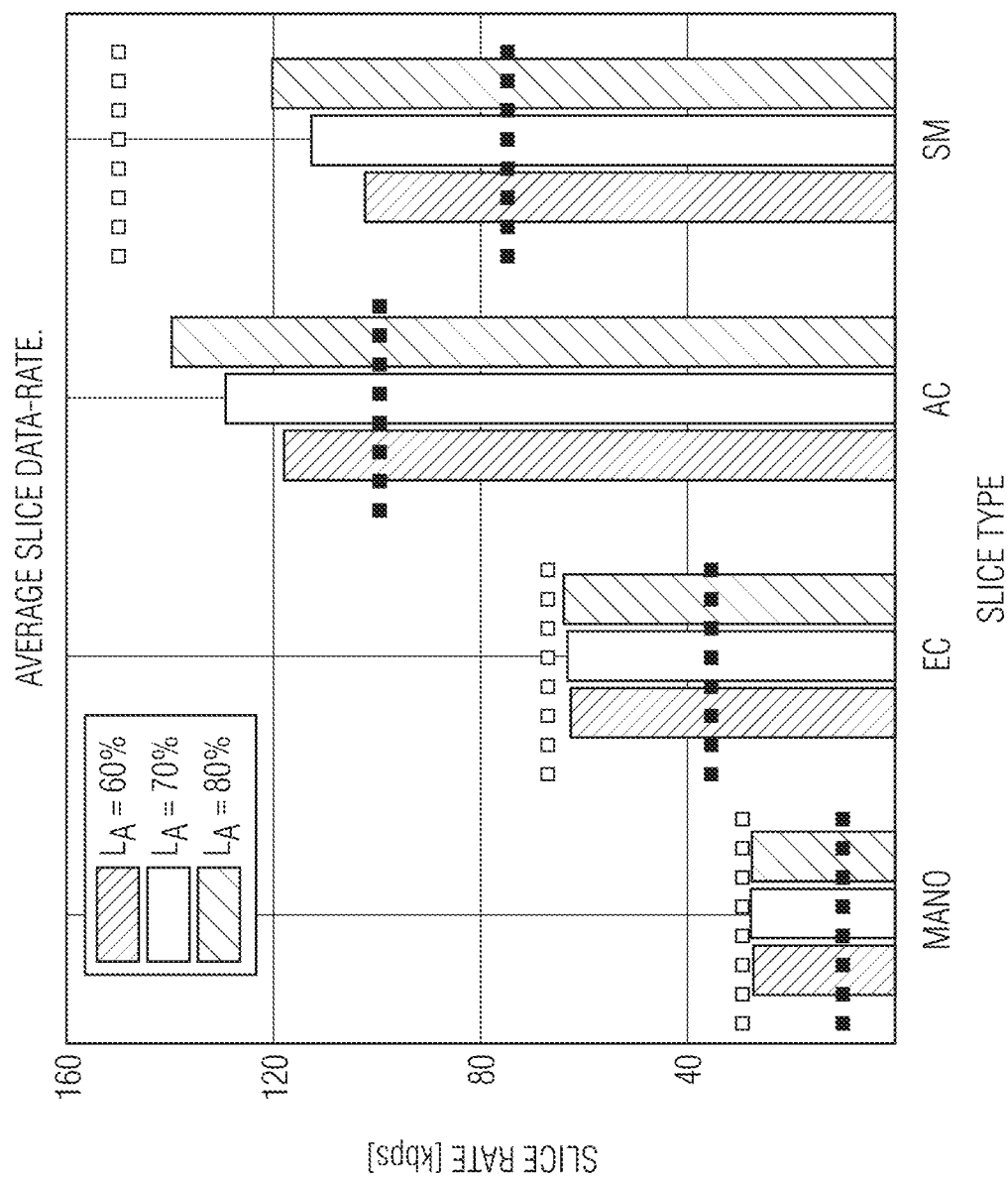
FIGS. 13A and 13B show average slice data rate and average slice excessive time delay, respectively, for different slice types and link availability percentages according to an embodiment.
Figure 13B:
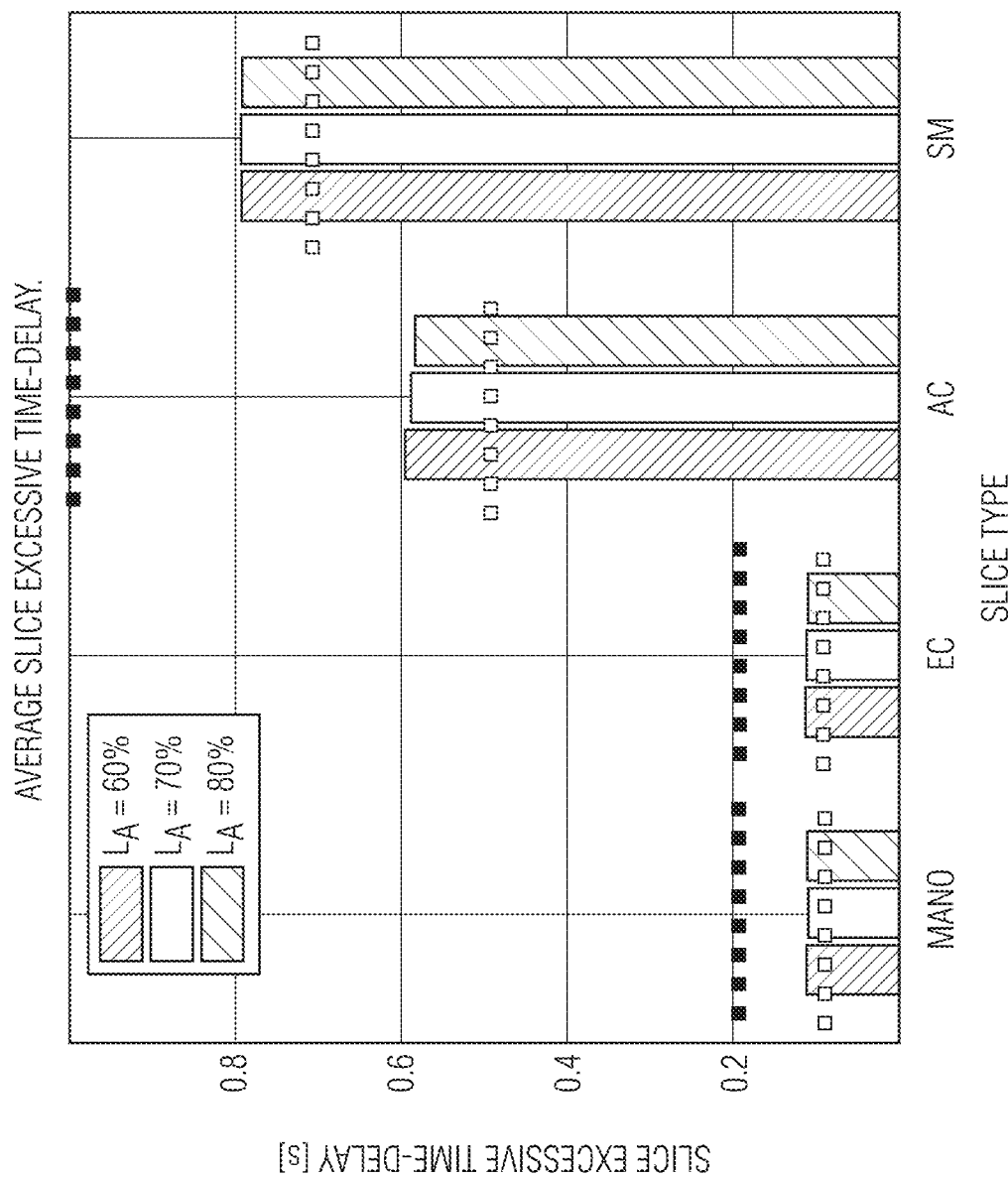
Figure 14:
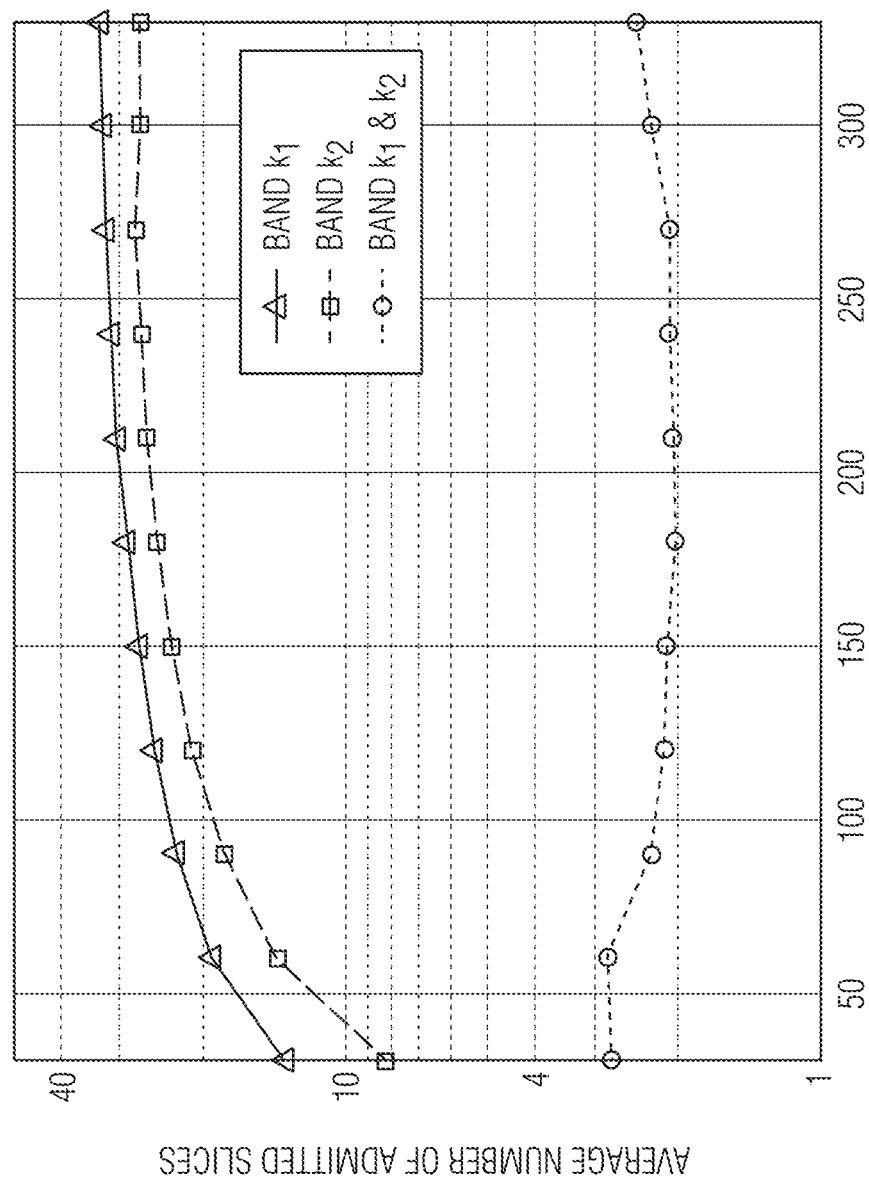
FIG. 14 shows illustrative utilization of transmission bands per admitted slices according to an embodiment.
Figure 15:
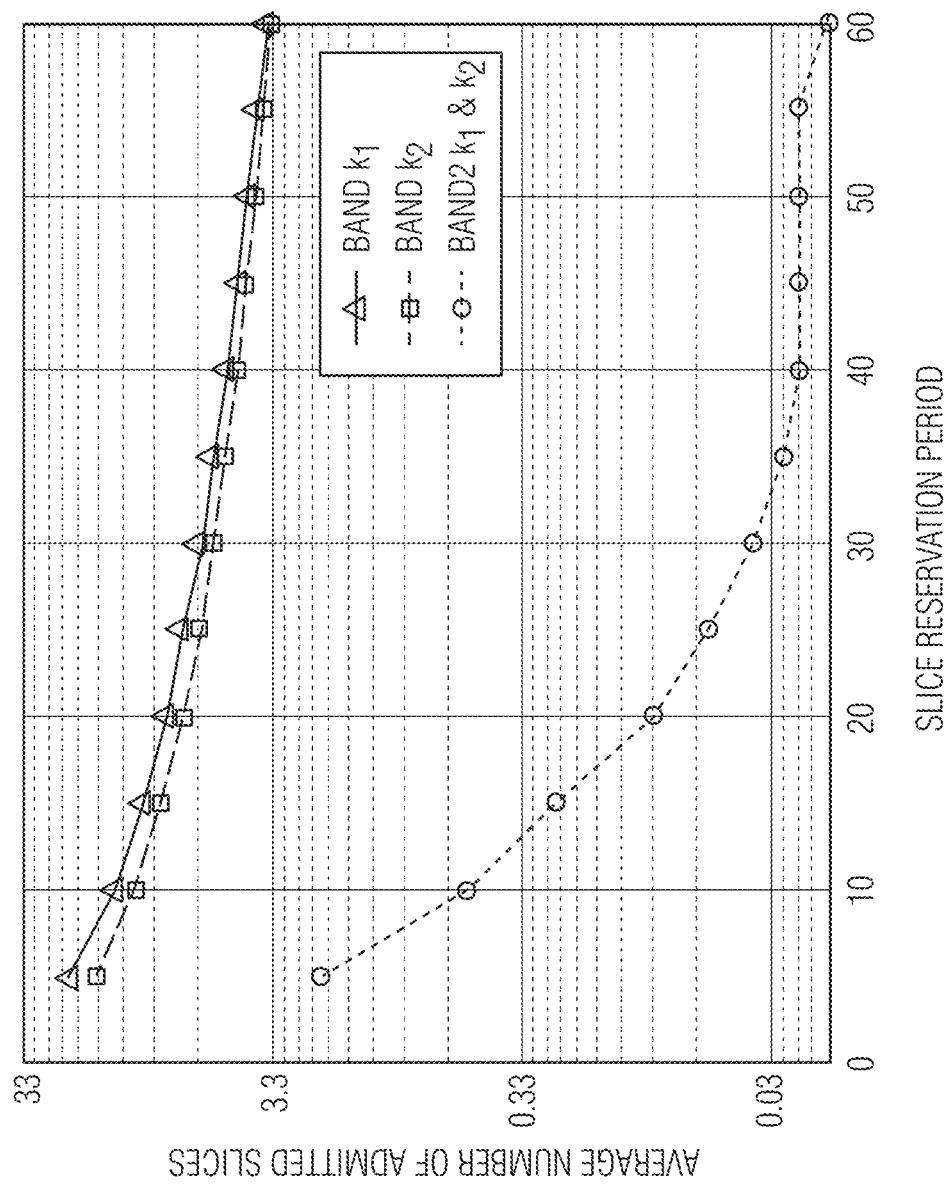
FIG. 15 shows utilization of transmission bands per admitted slice versus slice reservation period according to an embodiment.
Figure 16:
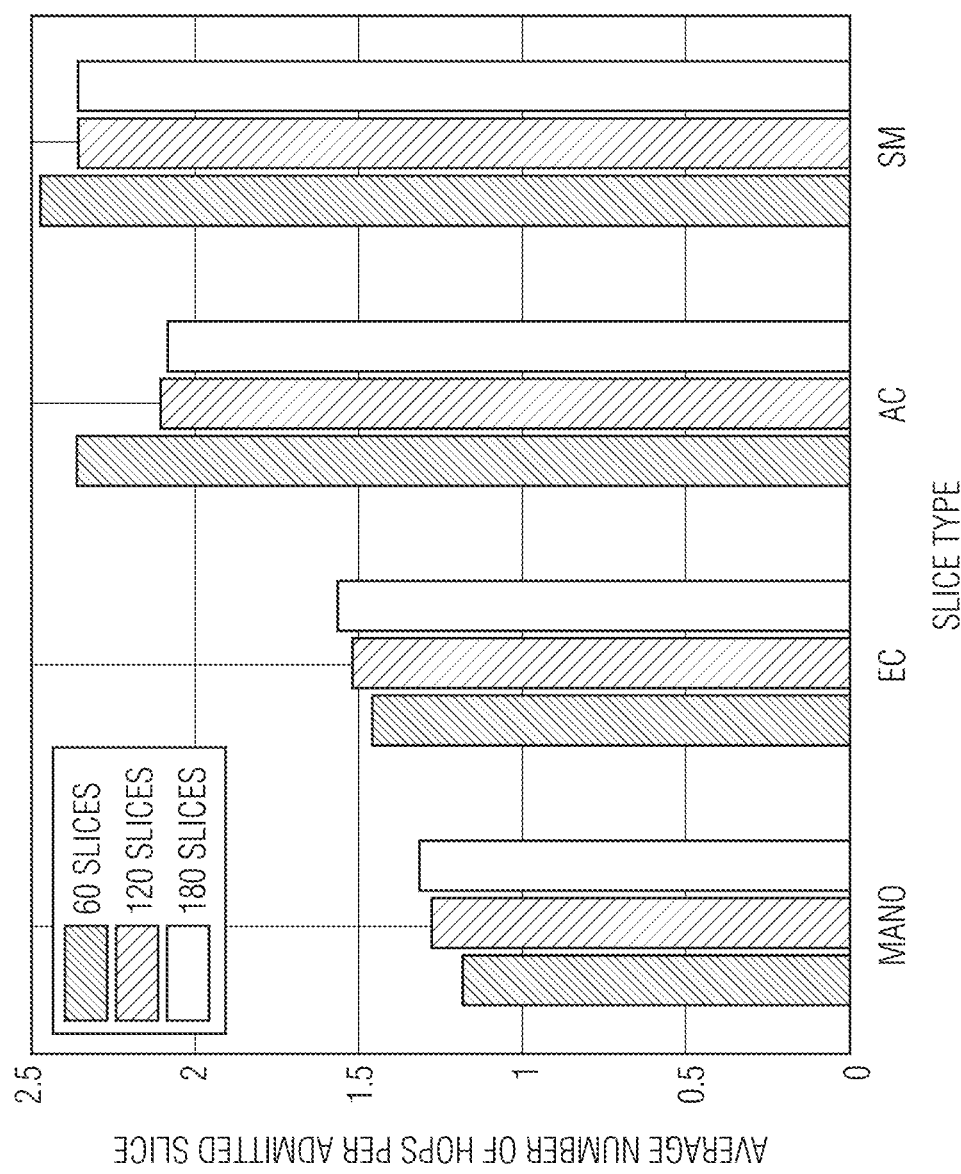
FIG. 16 shows an average number of hops per splice type for different numbers of slices according to an embodiment.

System operation is validated by evaluating the achieved data rates and time delays for admitted slices of different types against multiple parameters. In FIGS. 11A and 11B, the slice rates and time-delays are shown for different SLA types and number of slices. The MANO and EC slice types are the closest to the target performance since they are given higher priority to be selected at first and given higher resource allocation. The AC and SM slices' performance, on the other hand, is between the threshold and target SLA requirements, depending on the resources availability. As the number of slices increases, the rate and the excessive time-delay per slice are not changed considerably. However, slice admittance rate dramatically decreases as the number of slice requests increases, as shown in FIG. 12. The slice data rate and time delay for each slice type is also shown for different link availability percentages, in FIGS. 13A and 13B, respectively. As $L_A$ increases, the data rate of admitted slices approaches the target slice rate, especially for the high data rate slice types. However, the time delay is slightly improved. Next, we analyze the utilization of the transmission bands, k1 and k2. In FIG. 14, the utilization of transmission bands per admitted slices is shown against average number of slices. The curves show the number of admitted slices that are transmitted over routes that include links from the band k1 only, band k2 only, and both bands. Since most admitted slices are MANO and EC, high number of slices are transmitted over the band k1 which allows long distance communication and reduced latency. As the required data rate increases, more slices are admitted by allocating resources from the band k2. Interestingly, the route of some admitted slices includes links from both transmission bands, to balance achieved performance against SLA requirements and to avoid traffic congestion. Moreover, notice how the number of admitted slices saturates with the increase of number of required slices, as the network resources get highly utilized. Average number of admitted slices over transmission bands is also shown against the slice reservation period in FIG. 15. As the reservation period increases per admitted slice, a smaller number of slices can be admitted. Notice how in FIGS. 14 and 15, the number of slices transmitted over both bands, k1 and k2, is low. The complexity of the ANS algorithm can be reduced by filling the nominated routes tables for each band separately, and therefore, eliminate the possibility of a slice transmission over both bands. Because the number of slices transmitted over both bands is low, the performance degradation of eliminating this possibility might be acceptable. In FIG. 16, the average number of hops is shown against slice types. As expected, the number of hops tends to be low for MANO and EM slice types to minimize the transmission delay. On the other hand, AC and SM slice types have higher number of slices as higher data rates are required for these slice types.

Figure 17:
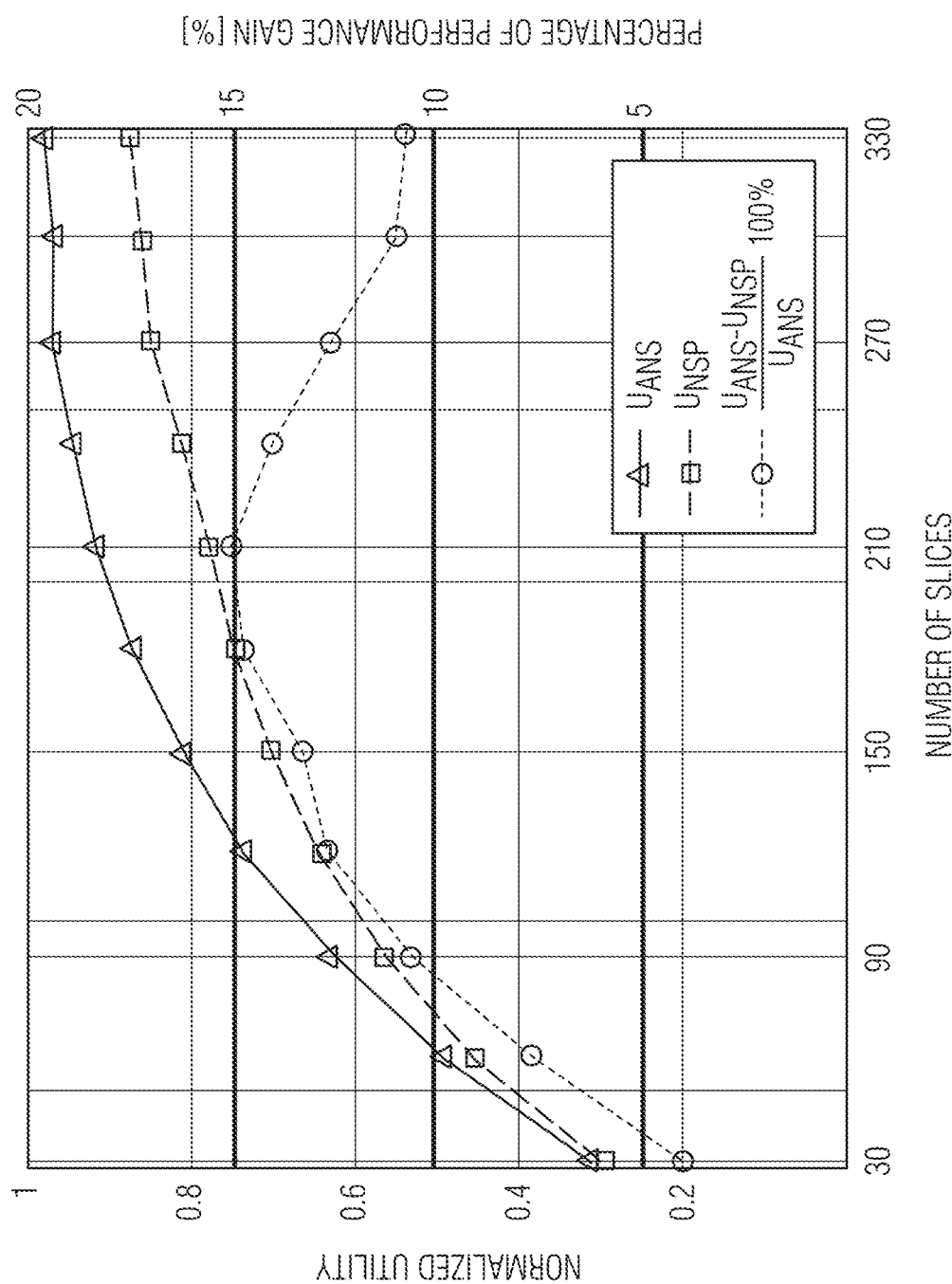
FIG. 17 shows a comparison between underwater acoustics automatic network slicing (ANS) and conventional next shortest path (NSP) performance in terms of achieved utility against average number of slice requests according to an embodiment.
Figure 18:
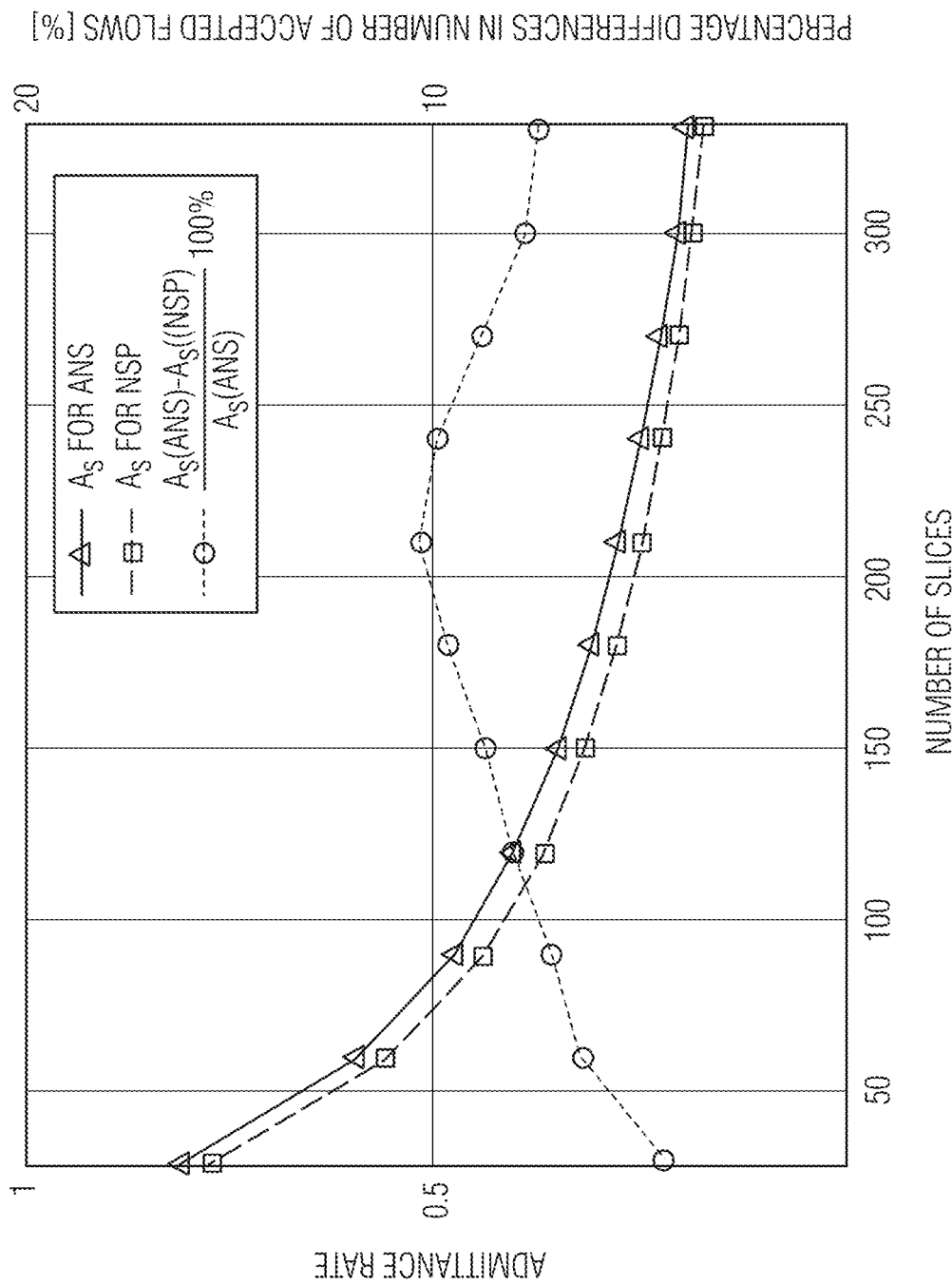
FIG. 18 shows a comparison between underwater acoustics ANS and conventional NSP performance in terms of slice admittance rate against average number of slice requests according to an embodiment.

The underwater acoustics signaling ANS solution compared with a conventional SDN algorithm based on next shortest path (NSP). The NSP algorithm routes a slice based on UAL's capacity and traffic already assigned to previous slices. However, NSP does not consider expected traffic by unassigned slices, slice's priority, and significance of slice time-delay vs slice rate. FIG. 17 shows the normalized utility for the ANS and NSP algorithms against the average number of concurrent slices. As the number of slices increases, the obtained utility increases, since available network resources are checked for an additional number of slices. The percentage of performance gain achieved by using underwater acoustics signaling ANS in comparison with NSP increases with number of slices, when the number of slices is low, to reach a maximum of 15%. This is because of the higher need for considering other slices traffic when the network congestion increases. As the network resource starts to saturate with the increased number of slices, the performance gain starts to decrease. The underwater acoustics signaling ANS algorithm always achieves higher utilities than the NSP algorithm with maximum gain percentages when the network resources are moderately utilized. FIG. 18 compares the number of admitted slices for our ANS solution against the NSP solution. The number of admitted slice is up to 10% higher when the ANS solution is used. The admittance curve follows a similar trend as the utility gain curve shown in FIG. 17.

Figure 19:
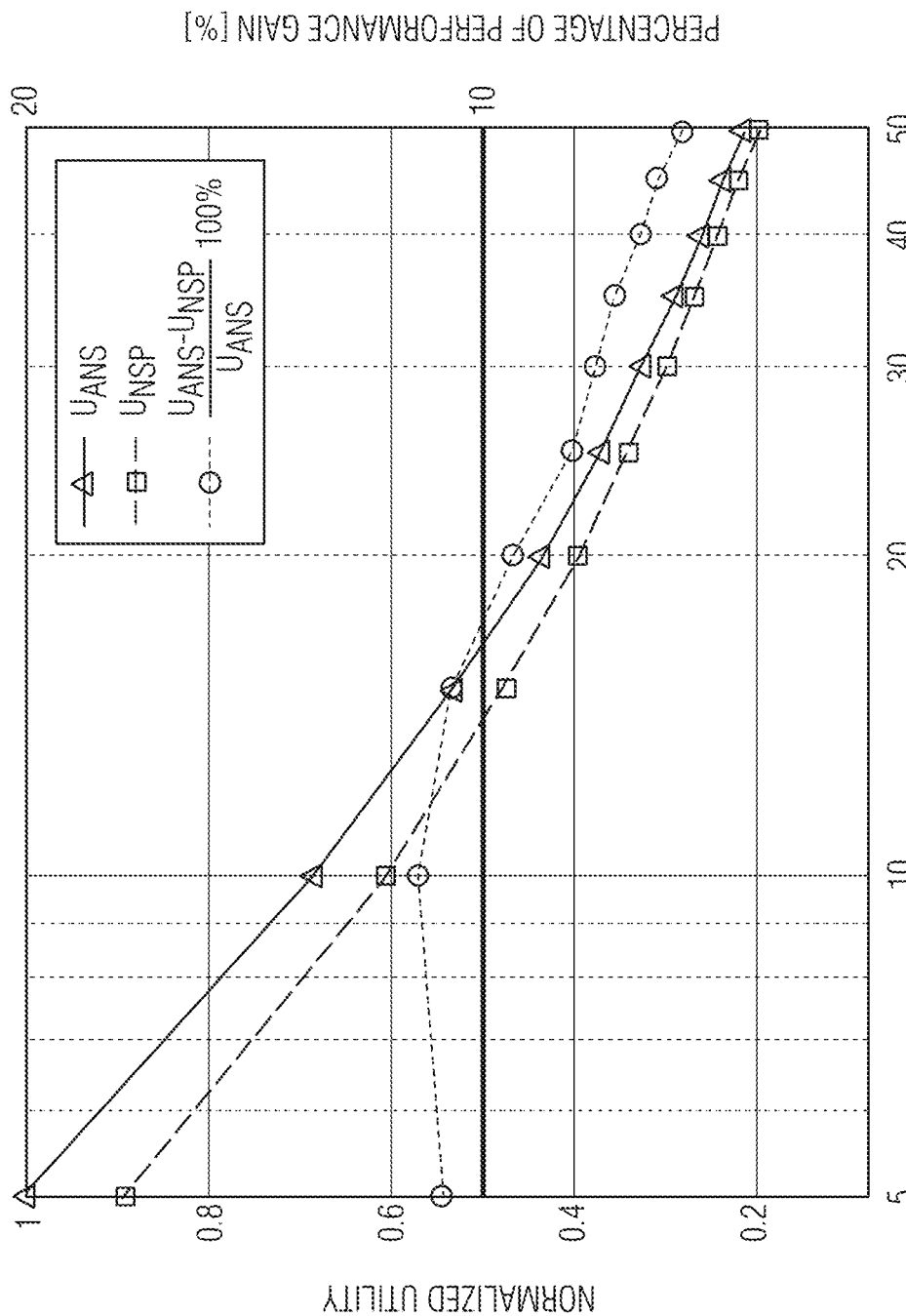
FIG. 19 shows a comparison between underwater acoustics ANS and conventional NSP performance in terms of utility against slice reservation period according to an embodiment.
Figure 20:
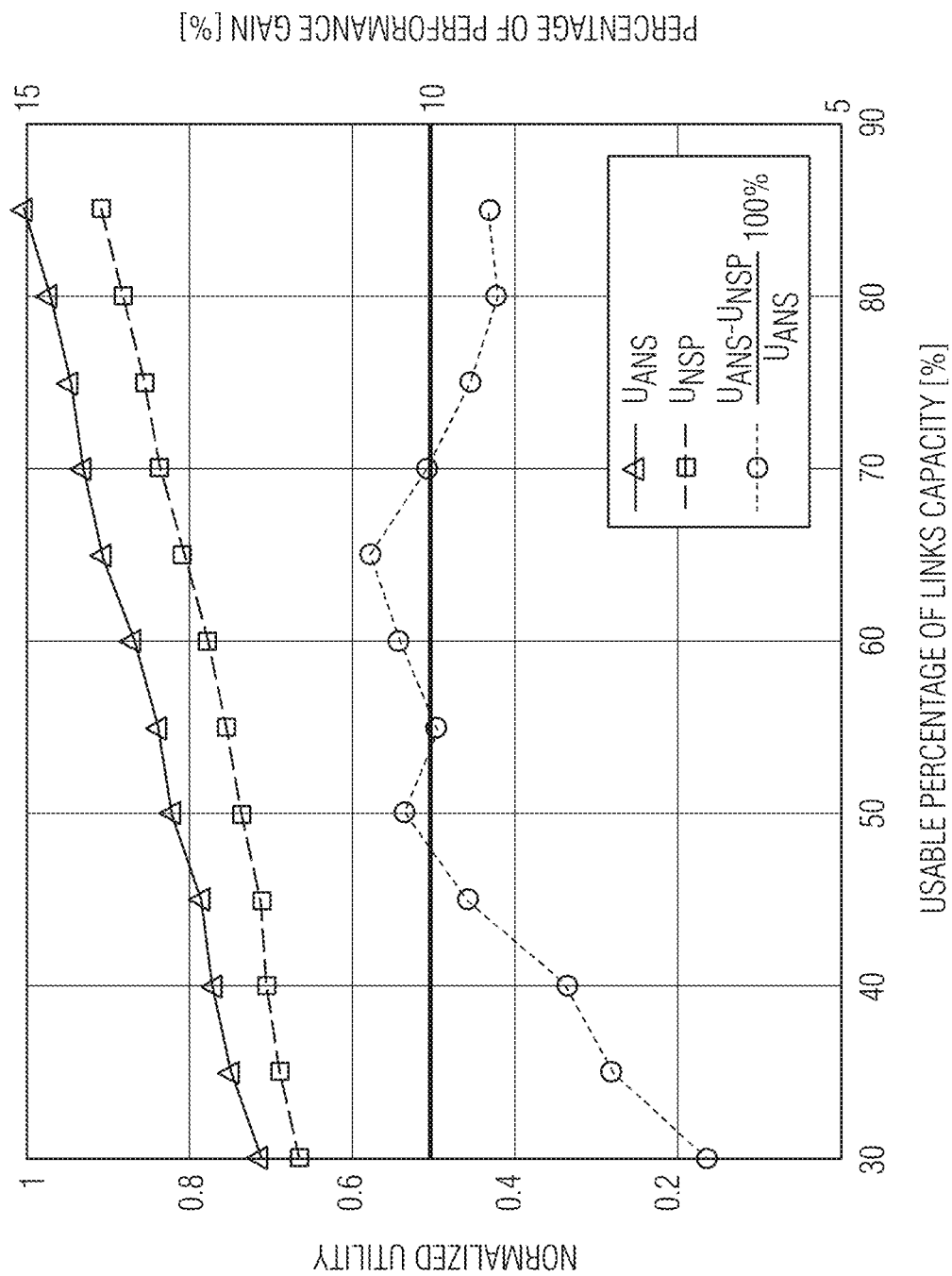
FIG. 20 shows a comparison between underwater acoustics ANS and conventional NSP performance in terms of achieved utility against link bandwidth availability percentage according to an embodiment.
Figure 21:
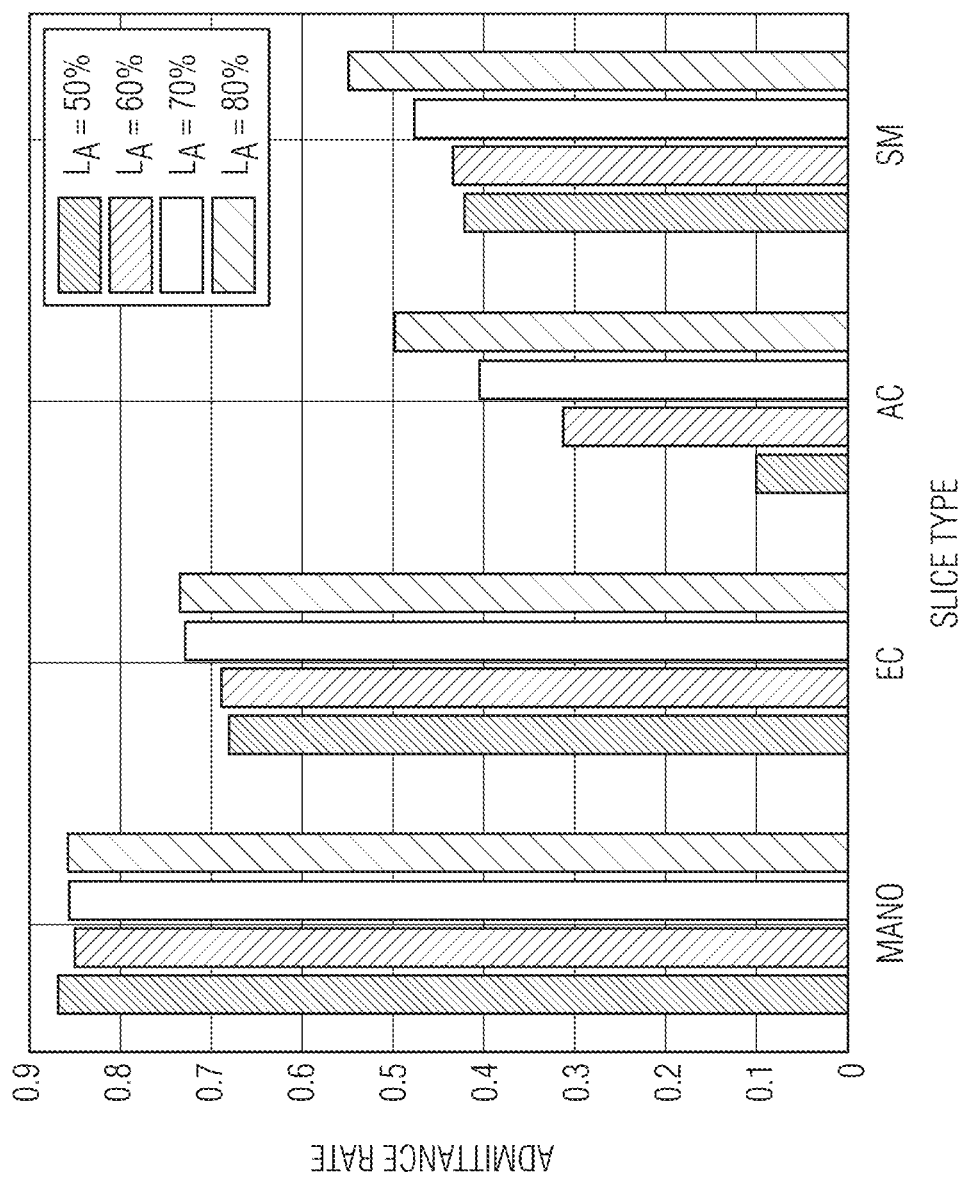
FIG. 21 shows admittance rate for different slice types and link bandwidth availability according to an embodiment.

Similarly, the utility gains of the ANS and the NSP algorithms against the slice reservation period and link availability are shown in FIGS. 19 and 20, respectively. As the slice reservation period increases and/or the network links availability percentage decreases, the network resources become more scarce. Therefore, the utility gain of applying the underwater acoustics signaling ANS over NSP is as low as 5% when the slice reservation period is 50 and around 6% when $L_A$=0.3. In FIG. 20, it is possible to notice that the utility gain increases as $L_A$ increases until 50%, before it decreases and increases again between $L_A$ [50%, 65%], and finally decreases after $L_A$>70%. This counterintuitive behavior is due to the utilization of two different transmission bands. To support this reasoning, FIG. 21 shows the slice admittance rate for different slice types and link availability. When the link availability is 50%, the admittance rate of high rate slices is as low as 0.1 for the AC slice type, and 0.4 for the SM slice type. At this link availability, the resources of the band k2 are scarce relative to the admission demand. On the other hand, the admittance rate for the MANO and EC slice types are as high as 0.85 and 0.7 respectively, which implies the abundance of band k1 resources to carry low latency slices. As the link availability increases from 50% to 70%, less gain is achieved in the k1 band and more gain in the k2 band. Finally, as the link availability increases beyond 70%, the gain of utilizing ANS over NSP saturates to around 9%.

The automatic network slicing enables globally optimized solutions for network resource management, enhances QoS, simplifies network operations, and reduces deployment costs. In this work, a novel optimization framework is introduced and solved for dynamic admission control, network routing, and resource allocation, automatically based on the SLAs. Such an SLA-based slicing can help abstracting the complexities of slice implementation and customization to address different use cases, and slice priorities. The proposed automatic slicing heuristic solution decouples the problem into two parts. First, the routes that meet the threshold SLA requirements are nominated. Then, we decide whether a slice is accepted or not, select one of the nominated routes, and allocate network resources such that a utility function is maximized. The proposed solution is tailored specifically for UACS as it assumes simple and small network architecture, depict UAC channel characteristics, and quickly eliminate routes with high time delay.

Numerical analysis show that the underwater acoustics ANS algorithm guarantees the required performance specified by the SLA thresholds to admitted slices. In comparison to conventional SDN based on NSP algorithms, the ANS algorithm according to embodiments discussed herein obtained up to 15% higher performance. While the underwater ANS algorithm always obtain higher gain than the NSP algorithm, maximum gain is observed when the network resources are moderately utilized. If, the ANS algorithm may be extended to embodiments that use multiple controllers to improve the performance gain of the system.

Figure 22:
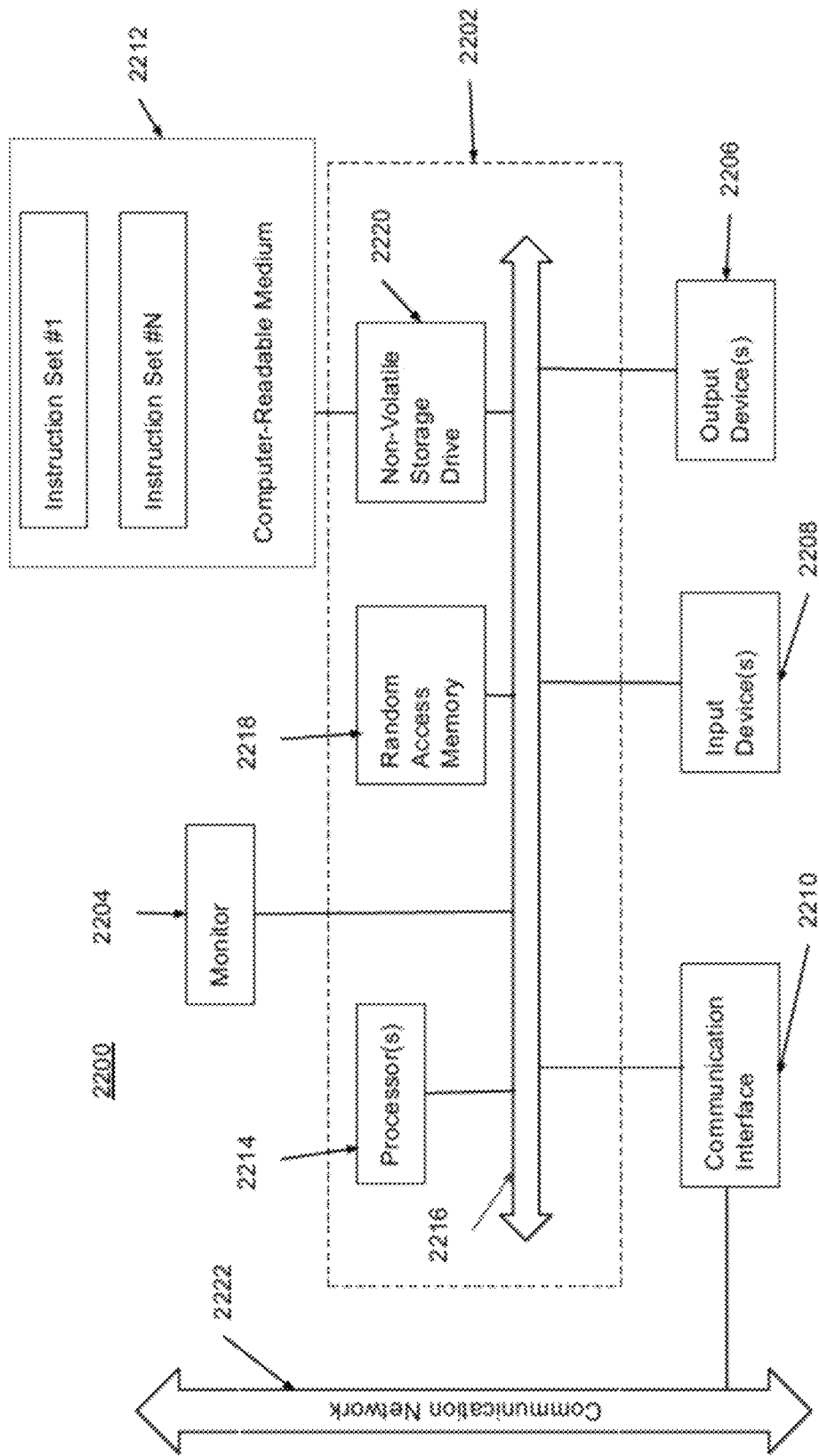
FIG. 22 shows an illustrative block diagram of a special-purpose computer system according to an embodiment.

FIG. 22 is a block diagram of a special-purpose computer system 2200 according to an embodiment. For example, system 2200 can deployed in controller 220 of FIG. 2. The methods and processes described herein may similarly be implemented by tangible, non-transitory computer readable storage mediums and/or computer-program products that direct a computer system to perform the actions of the methods and processes described herein. Each such computer-program product may comprise sets of instructions (e.g., codes) embodied on a computer-readable medium that directs the processor of a computer system to perform corresponding operations. The instructions may be configured to run in sequential order, or in parallel (such as under different processing threads), or in a combination thereof.

Special-purpose computer system 2200 comprises a computer 2202, a monitor 2204 coupled to computer 2202, one or more additional user output devices 2206 (optional) coupled to computer 2202, one or more user input devices 2208 (e.g., keyboard, mouse, track ball, touch screen) coupled to computer 2202, an optional communications interface 2210 coupled to computer 2202, and a computer-program product including a tangible computer-readable storage medium 2212 in or accessible to computer 2202. Instructions stored on computer-readable storage medium 2212 may direct system 2200 to perform the methods and processes described herein. Computer 2202 may include one or more processors 2214 that communicate with a number of peripheral devices via a bus subsystem 2216. These peripheral devices may include user output device(s) 2206, user input device(s) 2208, communications interface 2210, and a storage subsystem, such as random access memory (RAM) 2218 and non-volatile storage drive 2220 (e.g., disk drive, optical drive, solid state drive), which are forms of tangible computer-readable memory.

Computer-readable medium 2212 may be loaded into random access memory 2218, stored in non-volatile storage drive 2220, or otherwise accessible to one or more components of computer 2202. Each processor 2214 may comprise a microprocessor, such as a microprocessor from Intel® or Advanced Micro Devices, Inc.®, or the like. To support computer-readable medium 2212, the computer 2202 runs an operating system that handles the communications between computer-readable medium 2212 and the above-noted components, as well as the communications between the above-noted components in support of the computer-readable medium 2212. Exemplary operating systems include Windows® or the like from Microsoft Corporation, Solaris® from Sun Microsystems, LINUX, UNIX, and the like. In many embodiments and as described herein, the computer-program product may be an apparatus (e.g., a hard drive including case, read/write head, etc., a computer disc including case, a memory card including connector, case, etc.) that includes a computer-readable medium (e.g., a disk, a memory chip, etc.). In other embodiments, a computer-program product may comprise the instruction sets, or code modules, themselves, and be embodied on a computer-readable medium.

User input devices 2208 include all possible types of devices and mechanisms to input information to computer system 2202. These may include a keyboard, a keypad, a mouse, a scanner, a digital drawing pad, a touch screen incorporated into the display, audio input devices such as voice recognition systems, microphones, and other types of input devices. In various embodiments, user input devices 2208 are typically embodied as a computer mouse, a trackball, a track pad, a joystick, wireless remote, a drawing tablet, a voice command system. User input devices 2208 typically allow a user to select objects, icons, text and the like that appear on the monitor 2204 via a command such as a click of a button or the like. User output devices 2206 include all possible types of devices and mechanisms to output information from computer 2202. These may include a display (e.g., monitor 2204), printers, non-visual displays such as audio output devices, etc.

Communications interface 2210 provides an interface to other communication networks and devices and may serve as an interface to receive data from and transmit data to other systems, WANs and/or the Internet, via a wired or wireless communication network 2222. In addition, communications interface 2210 can include an underwater radio for transmitting and receiving data in an underwater network. Embodiments of communications interface 2210 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 2210 may be coupled to a computer network, to a FireWire® bus, or the like. In other embodiments, communications interface 2210 may be physically integrated on the motherboard of computer 2202, and/or may be a software program, or the like.

RAM 2218 and non-volatile storage drive 2220 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 2218 and non-volatile storage drive 2220 may be configured to store the basic programming and data constructs that provide the functionality of various embodiments of the present invention, as described above.

Software instruction sets that provide the functionality of the present invention may be stored in computer-readable medium 2212, RAM 2218, and/or non-volatile storage drive 2220. These instruction sets or code may be executed by the processor(s) 2214. Computer-readable medium 2212, RAM 2218, and/or non-volatile storage drive 2220 may also provide a repository to store data and data structures used in accordance with the present invention. RAM 2218 and non-volatile storage drive 2220 may include a number of memories including a main random access memory (RAM) to store instructions and data during program execution and a read-only memory (ROM) in which fixed instructions are stored. RAM 2218 and non-volatile storage drive 2220 may include a file storage subsystem providing persistent (non-volatile) storage of program and/or data files. RAM 2218 and non-volatile storage drive 2220 may also include removable storage systems, such as removable flash memory.

Bus subsystem 2216 provides a mechanism to allow the various components and subsystems of computer 2202 communicate with each other as intended. Although bus subsystem 2216 is shown schematically as a single bus, alternative embodiments of the bus subsystem may utilize multiple busses or communication paths within the computer 2202.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Whereas many alterations and modifications of the present invention will no doubt become apparent to a person of ordinary skill in the art after having read the foregoing description, it is to be understood that the particular embodiments shown and described by way of illustration are in no way intended to be considered limiting.

Moreover, the processes described above, as well as any other aspects of the disclosure, may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and optical data storage devices. In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol. Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of any one or more of any system, device, or server may be provided as a software construct, firmware construct, one or more hardware components, or a combination thereof, and may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of any one or more of any system device, or server are merely illustrative, and that the number, configuration, functionality, and interconnection of existing modules may be modified or omitted, additional modules may be added, and the interconnection of certain modules may be altered.

While there have been described systems, methods, and computer-readable media for enabling efficient control of a media application at a media electronic device by a user electronic device, it is to be understood that many changes may be made therein without departing from the spirit and scope of the disclosure. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method for controlling underwater acoustic communications within an underwater acoustic communications system (UACS) comprising a controller positioned at or near a surface of a water body and a plurality of nodes that are distributed throughout the water body, wherein the controller and the plurality of nodes have bidirectional acoustic communications capability to establish underwater acoustic links (UALs), the method comprising:
   receiving a plurality of slice requests each comprising a source and a destination, the plurality of slice requests associated with service level agreement (SLA) requirements;
   nominating, for each of the plurality of slice requests, one or more routes between the source and the destination that satisfy the SLA requirements;
   determining for at least one route in the nominated routes, a reservation of a portion of network resources sufficient to satisfy the SLA requirements for another route in the nominated routes;
   based on the determining, accepting the at least one slice request; and
   executing underwater acoustic communications via the UACS in accordance with the accepted at least one slice request.

2. The method of claim 1, wherein executing the underwater acoustic communications via the UACS in accordance with the plurality of slice requests comprises:
   deploying a first network slice in accordance with the plurality of slice requests; and
   deploying a second network slice in accordance with the plurality of slice requests, wherein the first network slice and the second network slice share at least one common resource of the UACS.

3. The method of claim 2, wherein the at least one common resource comprises at least one of processing power, transmission power, memory storage, or spectral bandwidth.

4. The method of claim 1, wherein determining that the at least one route in the nominated routes reserves a threshold amount of network resources for the another route in the nominated routes comprises:
   identifying a first set of performance metrics that should be maintained for a first transmission between the source and the destination;
   identifying a second set of performance metrics that should be maintained for a second transmission between an additional source and an additional destination;
   determining that the at least one route maintains the first set of performance metrics; and
   determining that an additional route maintains the second set of performance metrics.

5. The method of claim 1, wherein nominating the at least one route in the nominated routes that exist between the source and the destination that satisfy the SLA requirements comprises:
   determining a time delay requirement in the SLA requirements;
   determining that the time delay requirement is a low time delay requirement; and
   identifying a first plurality of routes in the nominated routes that include a low number of transmission hops between the source and the destination as a first set of routes.

6. The method of claim 1, wherein nominating the at least one route that exist between the source and the destination that satisfy the SLA requirements comprises:
   determining a time delay requirement in the SLA requirements;
   determining that the time delay requirement is a high time delay requirement; and
   identifying a first plurality of routes that include a high number of transmission hops between the source and the destination as a first set of routes.

7. The method of claim 1, further comprising:
   receiving an additional slice request comprising an additional source and an additional destination, the additional slice request is associated with further SLA requirements;
   based on the additional slice request, nominating an additional set of routes that exist between the additional source and the additional destination that satisfy the further SLA requirements;
   determining that the additional set of routes does not include a route that reserves a threshold amount of network resources for the one or more routes; and
   based on the determining, rejecting the additional slice request.

8. An acoustic communication system for controlling underwater acoustic communications comprising:

a plurality of nodes that are distributed throughout a water body; and a controller positioned at or near a surface of the water body, the controller configured to perform operations comprising:
receiving a plurality of slice requests each comprising a source and a destination, the plurality of slice requests associated with service level agreement (SLA) requirements;
nominating, for each of the plurality of slice requests, one or more routes between the source and the destination that satisfy the SLA requirements;
determining for at least one route in the nominated routes, a reservation of a portion of network resources sufficient to satisfy the SLA requirements for another route in the nominated routes;
based on the determining, accepting the at least one slice request; and
executing underwater acoustic communications in accordance with the accepted at least one slice request.

9. The acoustic communication system of claim 8, wherein executing the acoustic communications in accordance with the plurality of slice requests comprises:
deploying a first network slice in accordance with the plurality of slice requests; and
deploying a second network slice in accordance with the plurality of slice requests, wherein the first network slice and the second network slice share at least one common resource of the acoustic communication system.

10. The acoustic communication system of claim 9, wherein the at least one common network resource comprises at least one of processing power, transmission power, memory storage, or spectral bandwidth.

11. The acoustic communication system of claim 8, wherein determining that the at least one route in the nominated routes reserves a threshold amount of network resources for the another route in the nominated routes comprises:
identifying a first set of performance metrics that should be maintained for a first transmission between the source and the destination;
identifying a second set of performance metrics that should be maintained for a second transmission between an additional source and an additional destination;
determining that the at least one route maintains the first set of performance metrics; and
determining that an additional route maintains the second set of performance metrics.

12. The acoustic communication system of claim 8, wherein nominating the at least one route in the nominated routes that exist between the source and the destination that satisfy the SLA requirements comprises:
determining a time delay requirement in the SLA requirements;
determining that the time delay requirement is a low time delay requirement; and
identifying a first plurality of routes in the nominated routes that include a low number of transmission hops between the source and the destination as a first set of routes.

13. The acoustic communication system of claim 8, wherein nominating the at least one route that exist between the source and the destination that satisfy the SLA requirements comprises:

determining a time delay requirement in the SLA requirements;
determining that the time delay requirement is a high time delay requirement; and
identifying a first plurality of routes that include a high number of transmission hops between the source and the destination as a first set of routes.

14. The acoustic communication system of claim 8, further comprising:
receiving an additional slice request comprising an additional source and an additional destination, the additional slice request is associated with further SLA requirements;
based on the additional slice request, nominating an additional set of routes that exist between the additional source and the additional destination that satisfy the further SLA requirements;
determining that the additional set of routes does not include a route that reserves a threshold amount of network resources for the one or more routes; and
based on the determining, rejecting the additional slice request.

15. A non-transitory computer readable medium comprising one or more sequences of instructions which, when executed by a processor, causes a computing system to perform operations comprising:
receiving a plurality of slice requests each comprising a source and a destination, the plurality of slice requests associated with service level agreement (SLA) requirements;
nominating, for each of the plurality of slice requests, one or more routes between the source and the destination that satisfy the SLA requirements;
determining for at least one route in the nominated routes, a reservation of a portion of network resources sufficient to satisfy the SLA requirements for another route in the nominated routes;
based on the determining, accepting the at least one slice request; and
executing underwater acoustic communications in accordance with the accepted at least one slice request.

16. The non-transitory computer readable medium of claim 15, wherein executing the underwater acoustic communications in accordance with the plurality of slice requests comprises:
deploying a first network slice in accordance with the plurality of slice requests; and
deploying a second network slice in accordance with the plurality of slice requests, wherein the first network slice and the second network slice share at least one common resource.

17. The non-transitory computer readable medium of claim 15, wherein determining that the at least one route in the nominated routes reserves a threshold amount of network resources for the another route in the nominated routes comprises:
identifying a first set of performance metrics that should be maintained for a first transmission between the source and the destination;
identifying a second set of performance metrics that should be maintained for a second transmission between an additional source and an additional destination;
determining that the at least one route maintains the first set of performance metrics; and
determining that an additional route maintains the second set of performance metrics.

18. The non-transitory computer readable medium of claim 15, wherein nominating the at least one route in the nominated routes that exist between the source and the destination that satisfy the SLA requirements comprises:
  determining a time delay requirement in the SLA requirements;
  determining that the time delay requirement is a low time delay requirement; and
  identifying a first plurality of routes in the nominated routes that include a low number of transmission hops between the source and the destination as a first set of routes.

19. The non-transitory computer readable medium of claim 15, wherein nominating the at least one route that exist between the source and the destination that satisfy the SLA requirements comprises:
  determining a time delay requirement in the SLA requirements;
  determining that the time delay requirement is a high time delay requirement; and
  identifying a first plurality of routes that include a high number of transmission hops between the source and the destination as a first set of routes.

20. The non-transitory computer readable medium of claim 15, further comprising:
  receiving an additional slice request comprising an additional source and an additional destination, the additional slice request is associated with further SLA requirements;
  based on the additional slice request, nominating an additional set of routes that exist between the additional source and the additional destination that satisfy the further SLA requirements;
  determining that the additional set of routes does not include a route that reserves a threshold amount of network resources for the one or more routes; and
  based on the determining, rejecting the additional slice request.

* * * * *